(12) United States Patent
Kamata et al.

(10) Patent No.: US 10,488,735 B2
(45) Date of Patent: Nov. 26, 2019

(54) FOCAL-PLANE SHUTTER, AND IMAGING DEVICE AND ELECTRONIC EQUIPMENT THAT ARE PROVIDED THEREWITH

(71) Applicant: Nidec Copal Corporation, Tokyo (JP)

(72) Inventors: Kentaro Kamata, Tokyo (JP); Hiroshi Miyazaki, Tokyo (JP); Shigemi Takahashi, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 15/764,517

(22) PCT Filed: Sep. 21, 2016

(86) PCT No.: PCT/JP2016/077830
§ 371 (c)(1),
(2) Date: Mar. 29, 2018

(87) PCT Pub. No.: WO2017/057125
PCT Pub. Date: Apr. 6, 2017

(65) Prior Publication Data
US 2018/0314135 A1 Nov. 1, 2018

(30) Foreign Application Priority Data

Sep. 30, 2015 (JP) .................................. 2015-192730
Sep. 30, 2015 (JP) .................................. 2015-193948

(51) Int. Cl.
*G03B 9/40* (2006.01)
*G03B 9/42* (2006.01)

(52) U.S. Cl.
CPC .................. *G03B 9/40* (2013.01); *G03B 9/42* (2013.01)

(58) Field of Classification Search
USPC ........................................ 396/454, 455, 456
See application file for complete search history.

(56) References Cited

U.S. PATENT DOCUMENTS 4,692,009 A * 9/1987 Toyoda ..................... G03B 9/18
396/456
5,749,014 A * 5/1998 Shimada ................... G03B 9/18
396/484

(Continued)

FOREIGN PATENT DOCUMENTS

JP 2007-212504 A 8/2007
JP 2015-68905 A 4/2015

(Continued)

OTHER PUBLICATIONS

International Search Report dated Nov. 8, 2016 during the prosecution of PCT/JP2016/077830, English Translation.

*Primary Examiner* — Clayton E. LaBalle
*Assistant Examiner* — Warren K Fenwick
(74) *Attorney, Agent, or Firm* — Troutman Sanders LLP

(57) ABSTRACT

A focal plane shutter has a base plate with an opening; a leading and trailing blade opening and closing the opening; a leading blade driver; a trailing blade driver; a charging portion; a braking member; and a brake driver. The leading blade driver drives the leading blade through a first biasing force of a first biasing member and drives the leading blade through a second biasing force of a second biasing member. The trailing blade driver drives the trailing blade by a third biasing force of a third biasing member. The charging portion applies the second biasing force to the second biasing member and applies the third biasing force to the third biasing member. The braking member brakes the leading blade through friction and the brake driver moves the braking member to brake the leading blade, independently of the leading blade driver, the trailing blade driver, and the charging portion.

13 Claims, 34 Drawing Sheets

(56) References Cited

U.S. PATENT DOCUMENTS

| | | | |
|---|---|---|---|
| 6,835,009 B2* | 12/2004 | Toyoda | G03B 9/40 |
| | | | 396/484 |
| 7,830,444 B2* | 11/2010 | Matsumoto | B08B 7/02 |
| | | | 348/208.11 |
| 8,348,526 B2* | 1/2013 | Shintani | G03B 9/14 |
| | | | 396/357 |
| 2014/0078374 A1* | 3/2014 | Matsumoto | G03B 9/26 |
| | | | 348/335 |
| 2015/0109523 A1 | 4/2015 | Tanaka | |
| 2016/0109782 A1 | 4/2016 | Tanaka | |

FOREIGN PATENT DOCUMENTS

| | | |
|---|---|---|
| JP | 2015-79113 A | 4/2015 |
| JP | 2015-125298 A | 7/2015 |

\* cited by examiner

FOCAL-PLANE SHUTTER, AND IMAGING DEVICE AND ELECTRONIC EQUIPMENT THAT ARE PROVIDED THEREWITH

CROSS-REFERENCE TO RELATED APPLICATIONS

This is a U.S. national phase application under 35 U.S.C. § 371 of International Patent Application No. PCT/JP2016/077830, filed Sep. 21, 2016, and claims benefit of priority to Japanese Patent Application No. 2015-192730, filed Sep. 30, 2015, and Japanese Patent Application No. 2015-193948, filed Sep. 30, 2015. The entire contents of these applications are hereby incorporated by reference.

FIELD OF TECHNOLOGY

The present invention relates to a focal plane shutter, and to an imaging device and electronic device provided therewith.

BACKGROUND

Among the shutters that are installed in imaging devices, there are focal plane shutters that are provided with a leading blade, a trailing blade, the leading blade driving portion for driving the leading blade, and a trailing blade driving portion for driving the trailing blade. The leading blade driving portion and the trailing blade driving portion are each structured from a first driving member and a second driving member. This focal plane shutter may operate in a normally closed mode or a normally open mode. Here the normally open mode is that wherein the opening is open when in imaging standby wherein, after the leading blade has closed the opening, the leading blade opens the opening, following which the trailing blade operates to close the opening. The normally closed mode is that wherein the opening is closed by the leading blade when in imaging standby mode, and, at the time of imaging, the leading blade opens the opening, following which the trailing blade operates to close the opening. In an exposing operation wherein the leading blade opens the opening and the trailing blade closes the opening, an image of the photographic subject is captured by an imaging element of the imaging device.

For example, in an exposing operation in the focal plane shutter set forth in Japanese Unexamined Patent Application Publication 2015-125298, the leading blade second driving member is rotated clockwise by the biasing force of a leading blade driving spring, to push a leading blade first driving member, which is connected to the leading blade. A leading blade second driving member rotates following the leading blade first driving member, causing the leading blade to move. The leading blade opens the opening thereby. Moreover, after a prescribed time following the start of movement of the leading blade, the trailing blade closes the opening by moving in the same manner as the leading blade.

The focal plane shutter set forth in Japanese Unexamined Patent Application Publication 2015-125298 is provided with a leading blade brake lever for braking the leading blade that is moving during the exposing operation. The leading blade brake lever is biased in the clockwise direction by a spring. The leading blade brake lever makes sliding contact with a driving pin for the leading blade first driving member, to rotate in the counterclockwise direction. The leading blade brake lever is biased in the clockwise direction, and thus can brake the leading blade first driving member, that is, can brake the leading blade that is connected to the leading blade first driving member.

When the focal plane shutter setting forth in Japanese Unexamined Patent Application Publication 2015-125298 operates in the normally closed mode, the leading blade is returned to a position that closes the opening, prior to the leading blade first driving member and the leading blade second driving member starting the exposing operation, and thus the brake lever for the leading blade is rotated in the clockwise direction by the biasing force of the spring. The clockwise rotation of the leading blade brake lever is stopped by the leading blade brake lever contacting a stopper pin. Through this, the leading blade brake lever returns to the position of sliding contact with the driving pin of the leading blade first driving member. Note that the discharging operation is an operation that applies a biasing force to the leading blade driving spring and the trailing blade driving spring for subsequent imaging. Moreover, when the focal plane shutter set forth in Japanese Unexamined Patent Application Publication 2015-125298 operates in the normally open mode, the leading blade first driving member is returned to the position from prior to the beginning of the exposing operation through releasing of the retention of the driving pin of the leading blade first driving member, after the start of imaging, and thus the leading blade brake lever, in the same manner as in the normally closed mode, is returned to the position of sliding contact of with the driving pin of the leading blade first driving member. That is, the leading blade brake lever set forth in Japanese Unexamined Patent Application Publication 2015-125298 is returned to the position for braking the leading blade, linked to the operation of the leading blade first driving member, through the same biasing force as the biasing force for braking the leading blade.

SUMMARY

Because in imaging devices in recent years the shutter speed is fast, there is the need for a large braking force in the brake for braking the shutter blade in an exposing operation. Moreover, in addition to the normally closed mode and the normally open mode, the focal plane shutter must operate also in an electronic mode. Here the electronic mode is one wherein the opening is open during imaging standby, where, at the time of imaging, the trailing blade operates to close the opening after the start of imaging by the imaging element of the imaging device.

In Japanese Unexamined Patent Application Publication 2015-125298, when the biasing force of the spring is large, in order to increase the braking force of the leading blade brake lever, the impact produced by the leading blade brake lever contacting the stopper pin will also be large. Thus there is a time lag in the operation of the focal plane shutter because the focal plane shutter cannot execute the subsequent operation until the vibration of the focal plane shutter caused by this impact settles. Moreover, because the force with which the leading blade brake lever pushes the leading blade back is large, the leading blade is pushed back by the leading blade brake lever and rebounds. When the leading blade rebounds, this can reduce uneven exposure and smearing in the imaging device. Consequently, it is difficult to increase the braking force of the leading blade brake lever through increasing the biasing force.

Moreover, in the normally open mode, the leading blade opens the opening in the exposing operation following first having been closed that the time of imaging. Consequently, in the exposing operation, if the braking member that brakes the leading blade were disposed, prior to the start of imaging, at the position for braking the leading blade, the braking member and the leading blade first driving member for closing the opening will collide prior to the exposing operation. That is, prior to the start of imaging, in the exposing operation, the braking member for braking the leading blade cannot be disposed at the position for braking the leading blade through the biasing force.

The present invention was created in consideration of the facts set forth above, and the object thereof is to provide a focal plane shutter able to brake the leading blade with a large braking force, and to provide an imaging device and electronic device provided therewith.

In order to achieve the object set forth above, a focal plane shutter according to an example according to the present invention includes a base plate wherein an open is formed;

a leading blade and a trailing blade for open and closing the opening;

a leading blade driving portion comprising: a first leading blade driving member that is coupled with the leading blade, that is moved through a first biasing force of a first biasing member, and that drives the leading blade in the direction of opening the opening; and a second leading blade driving member that moves in accordance with the first leading blade driving member through a second biasing force of a second biasing member in the direction that is opposite to that of the first driving force, to drive the leading blade in the direction of opening the opening;

a trailing blade driving portion having a trailing blade driving member that is moved by a third biasing force of a third biasing member to drive the trailing blade in the direction of closing the opening;

a charging portion for applying the second biasing force to the second biasing member and for applying the third biasing force to the third biasing member;

a braking member for braking the leading blade, through friction with a friction member that is provided on the base plate, when the leading blade opens the opening; and a brake driving portion for moving the braking member to a position for braking the leading blade, independently of the leading blade driving portion, the trailing blade driving portion, and the charging portion.

The braking member may be out of the path of movement of the first leading blade driving member when the leading blade closes the opening.

The brake driving portion may have a first actuator for moving the braking member to a position for braking the leading blade.

The brake driving portion may have a cam member that is rotated by the first actuator, to push the braking member; and the cam member may move away from the braking member when the braking member is braking the leading blade.

The focal plane shutter may have:

a first constraining member for constraining movement of the first leading blade driving member, and a second actuator for moving the first constraining member to a position for constraining the movement of the first leading blade driving member.

The focal plane shutter may have:

a second constraining member that is moved by the first actuator, for constraining movement of the first leading blade driving member.

The first leading blade driving member may have a cutaway portion on a side face; and the second constraining member may have a first protruding portion for engaging the cutaway portion of the first leading blade driving member.

The first leading blade driving member may have a driving pin that is linked to the leading blade; and the second constraining member may have a second protruding portion for engaging the driving pin.

The charging portion may comprises a setting portion for pushing the second leading blade driving member and the trailing blade driving member, and a third actuator for driving the setting portion.

The third actuator may:

be driven by a first driving voltage for applying the second biasing force and the third biasing force to the second biasing member and the third biasing member, respectively, in imaging wherein, from a state wherein the leading blade has closed the opening, the leading blade opens the opening and the trailing blade closes the opening; and be driven by a second driving voltage, which is smaller than the first driving voltage, for applying the third biasing force to the third biasing member in imaging wherein, from a state wherein the leading blade and the trailing blade have opened the opening, the trailing blade closes the opening.

A focal plane shutter according to another aspect according to the present invention includes a base plate wherein an open is formed;

a leading blade and a trailing blade for open and closing the opening;

a leading blade driving portion for driving the leading blade in the direction of opening the opening through a first biasing force of a first biasing member;

a trailing blade driving portion for driving the trailing blade in the direction of closing the opening through a second biasing force of a second biasing member; and a first actuator for applying the first biasing force to the first biasing member and applying the second biasing force to the second biasing member, wherein:

the first actuator:

is driven by a first driving voltage for applying the first biasing force and the second biasing force to the first biasing member and the second biasing member, respectively, in imaging wherein, from a state wherein the leading blade has closed the opening, the leading blade opens the opening and the trailing blade closes the opening; and is driven by a second driving voltage, which is smaller than the first driving voltage, for applying the second biasing force to the second biasing member in imaging wherein, from a state wherein the leading blade and the trailing blade have opened the opening, the trailing blade closes the opening.

In order to achieve the object set forth above, an imaging device according to a third aspect according to the present invention is equipped with a focal plane shutter set forth above.

In order to achieve the object set forth above, an electronic device according to a fourth aspect according to the present invention is equipped with a focal plane shutter set forth above.

The present invention enables braking of the leading blade with a large braking force in a plurality of operating modes.

BRIEF DESCRIPTIONS OF THE DRAWINGS

DETAILED DESCRIPTION

A focal plane shutter 1 according to an embodiment according to the present invention will be explained referencing FIG. 1 through FIG. 18B.

The focal plane shutter 1 according to the present example is equipped in an imaging device 10, and electronic device, or the like. The imaging device 10 is, for example, a camera or a monitoring camera, which may be a digital camera, or the like. Moreover, the electronic device is, for example, a mobile terminal, such as a smart phone, or a laptop or notebook computer, that includes an imaging function.

Figure 1A:
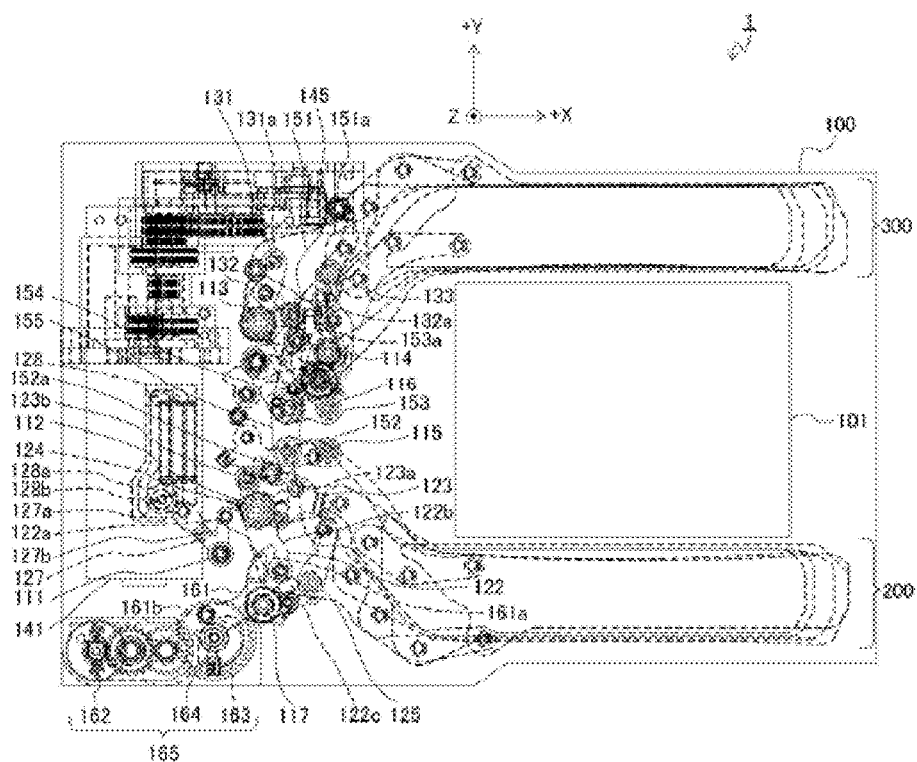
FIG. 1A is a front view depicting an initial state of a focal plane shutter according to a an example according to the present invention.
Figure 1B:
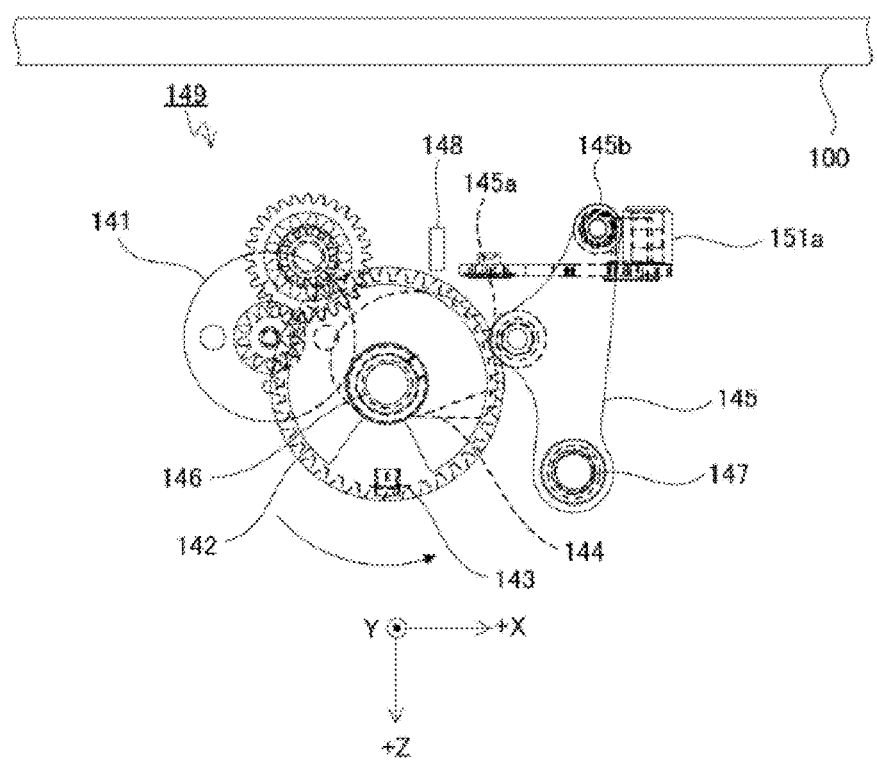
FIG. 1B is a schematic diagram wherein a setting driving portion in the focal plane shutter depicted in FIG. 1A is viewed from the +Y axial direction.
Figure 2:
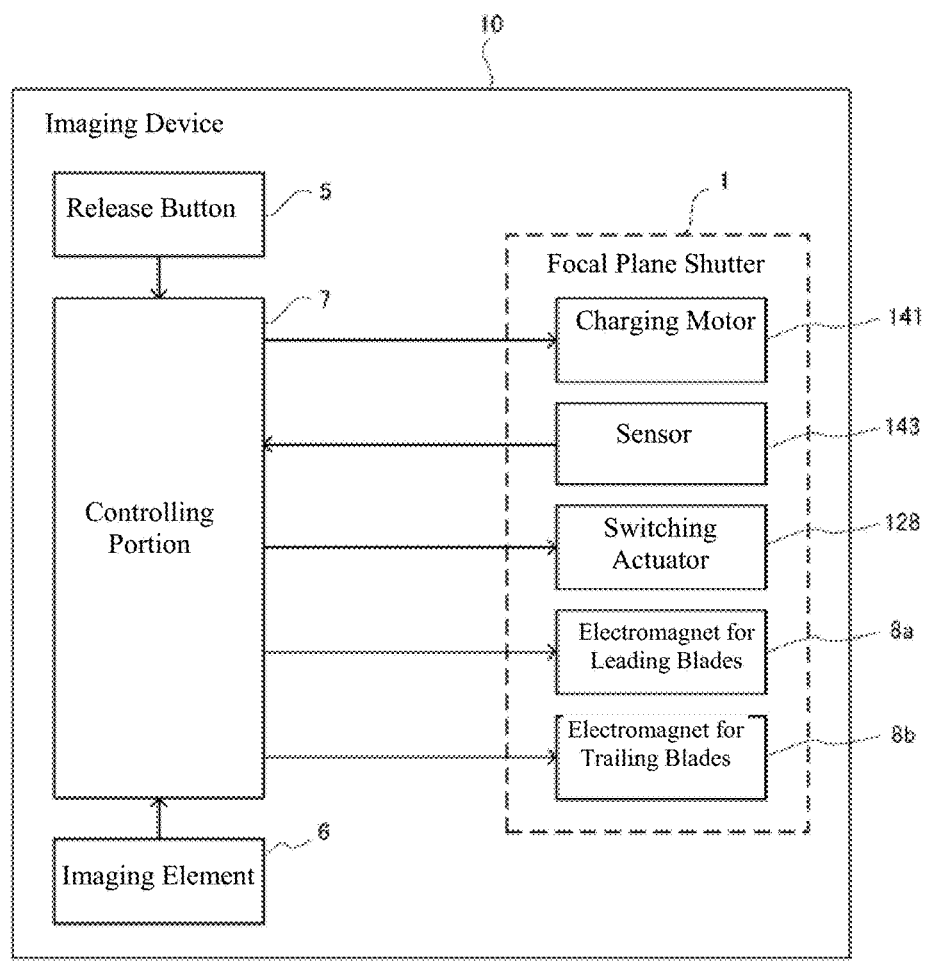
FIG. 2 is a block diagram illustrating the structure of an imaging device equipped with a focal plane shutter according to the example according to the present invention.

The structure of the focal plane shutter 1 will be explained first in reference to FIG. 1A through FIG. 2. FIG. 1A is a front view showing the initial state of the focal plane shutter. Note that, for ease in understanding, the explanation will be with the lengthwise direction of the focal plane shutter 1 toward the right as the +X axial direction (the direction toward the right in the plane of the paper), with the front view direction (toward the front of the plane of the paper) as the +Z axial direction, and with the direction that is perpendicular to the +X axial direction and the +Z axial direction (the direction that is toward the top in the plane of the paper) as the +Y the axial direction in FIG. 1A. FIG. 1B is a schematic diagram wherein the setting driving portion 149 in the focal plane shutter 1 shown in FIG. 1A is viewed from the +Y axial direction. FIG. 2 is a block diagram depicting the structure of an imaging device 10 that is equipped with the focal plane shutter 1. The focal plane shutter 1 comprises a base plate 100, leading blades 200, trailing blades 300, a leading blade driving portion, a trailing blade driving portion, and a switching portion. Moreover, the focal plane shutter 1 comprises a charging portion and a braking portion.

(Base Plate)

The base plate 100 is a plate-shaped body formed from a synthetic resin. The outer shape of the base plate 100 is essentially rectangular. Moreover, an opening 101 is formed in essentially the center portion of the base plate 100.

A middle plate and a supplementary base plate (not shown) are attached sequentially, with prescribed spacing, on the −Z side face of the base plate 100. A blade chamber, for enclosing the leading blades 200, is formed between the base plate 100 and the middle plate. Moreover, a blade chamber for enclosing the trailing blades 300 is formed between the middle plate and the supplementary base plate. Openings (not shown) that are similar to the opening 101 are formed in the middle plate and the supplementary base plate. In the present example, the shape of the opening, as the shutter unit through which light from the imaging subject passes, is not limited to the shape of the opening of the middle plate and of the supplementary base plate, but is determined by the shape of the opening 101.

As illustrated in FIG. 1A, shafts 111, 112, 113, 114, 115, 116, and 117 protrude from the +Z side face of the base plate 100. Moreover, a plurality of columns (not shown) protrude from the +Z side face of the base plate 100.

(Leading Blades and Trailing Blades)

The leading blades 200 and the trailing blades 300 are shutter blades for opening and closing the opening 101. The opening 101 is open in the state wherein the leading blades 200 and the trailing blades 300 are stacked together, and the opening 101 is closed in the state wherein they are deployed. The leading blades 200 and the trailing blades 300 are each structured from five shutter blades. Note that the number of shutter blades is not limited thereto. The leading blades 200 are enclosed in an enclosing chamber between the base plate 100 and the middle plate. The trailing blades 300 are enclosed in an enclosing chamber between the middle plate and the supplementary base plate. The operation by which the leading blades 200 and the trailing blades 300 open and close the opening 101 is controlled by the leading blade driving portion and the trailing blade driving portion, which drive the respective blades.

(Leading Blade Driving Portion)

The leading blade driving portion, which drives the leading blades 200, will be explained. The leading blade driving portion, as illustrated in FIG. 1A, is structured from a first leading blade driving member 122, a second leading blade driving member 123, and a first engaging member 125. The leading blade driving portion is provided on the +Z side surface of the base plate 100.

The first leading blade driving member 122 drives, through a biasing force of a leading blade setting spring (not shown), the leading blades 200 from a state wherein the opening 101 is open to a state wherein it is closed. The first leading blade driving member 122 is supported rotatably on a shaft 112. Moreover, the first leading blade driving member 122 is biased in the counterclockwise direction by the leading blade setting spring. The leading blade setting spring is, for example, a coil spring. The first leading blade driving member 122 has an engaged portion 122*a*, a pushed portion 122*b*, and a driving pin 122*c*.

The engaged portion 122*a*, in a state wherein the leading blades 200 have opened the opening 101, is engaged with a first constraining member 127 of the switching portion. The engaged portion 122*a* being engaged with the first constraining member 127 causes the rotation of the first leading blade driving member 122 in the counterclockwise direction due to the biasing force of the leading blade setting spring to be constrained.

The pushed portion 122*b* is pushed by a pushing portion 123*a* of the second leading blade driving member 123 when the second leading blade driving member 123 is rotated in the clockwise direction by the biasing force of the leading blade driving spring 124. The pushed portion 122*b* being pushed by the pushing portion 123*a* of the second leading blade driving member 123 causes the first leading blade driving member 122 to rotate in the clockwise direction together with the second leading blade driving member 123.

The driving pin 122*c* is provided on the −Z side of the first leading blade driving member 122. The driving pin 122*c* is inserted into an elongated hole (not shown) that is formed in the base plate 100. The elongated hole of the base plate 100 is formed in an arc shape, facing in the upward direction in FIG. 1A. The elongated hole of the base plate 100 functions as a guide for the movement of the driving pin 122*c*. Moreover, the driving pin 122*c* is connected to the leading blades 200 in the blade chamber that encloses the leading blades 200. Consequently, the leading blades 200 are deployed or stacked together in accordance with the rotation of the first leading blade driving member 122. In the present example, when the first leading blade driving member 122 rotates in the clockwise direction so that the driving pin 122*c* moves from the top end to the bottom end of the elongated hole, the leading blades 200 stack together, to open the opening 101. When the first leading blade driving member 122 rotates in the counterclockwise direction so that the driving pin 122*c* moves from the bottom end to the top end of the elongated hole, the leading blades 200 deploy, to close the opening 101.

The second leading blade driving member 123 causes the first leading blade driving member 122 to undergo following motion, to drive the leading blades 200 from a state wherein the opening 101 is closed to a state wherein it is open. The second leading blade driving member 123 is supported rotatably on the shaft 112. The second leading blade driving member 123 is biased in the clockwise direction by the leading blade driving spring 124. The leading blade driving spring 124 is, for example, a coil spring that is fitted on the shaft 112. The second leading blade driving member 123 is rotated in the clockwise direction in accordance with the first leading blade driving member 122 by the biasing force of the leading blade driving spring 124. When the driving pin 122*c* of the first leading blade driving member 122 arrives at the bottom end of the elongated hole, the rotation of the second leading blade driving member 123 is stopped. The leading blades 200 open the opening 101 thereby. The second leading blade driving member 123 has a pushing portion 123a and a pushed portion 123b.

The pushing portion 123a pushes the pushed portion 122b of the first leading blade driving member 122. When the second leading blade driving member 123 is rotated in the clockwise direction by the biasing force of the leading blade driving spring 124, the pushing portion 123a pushes the pushed portion 122b of the first leading blade driving member 122, to cause the first leading blade driving member 122 to undergo following motion. Note that the biasing force of the leading blade driving spring 124 is larger than the biasing force of the leading blade setting spring, and thus the second leading blade driving member 123, through the biasing force of the leading blade driving spring 124, is able to cause the first leading blade driving member 122 to rotate in the clockwise direction against the biasing force from the leading blade setting spring.

When the leading blade setting member 152 of the charging portion is rotated in the clockwise direction, the pushed portion 123b is pushed by the pushing portion 152a of the leading blade setting member 152. Through this, the second leading blade driving member 123 is rotated in the counterclockwise direction against the biasing force of the leading blade driving spring 124.

When the application of power to an electromagnet 8a for the leading blades has been started, the first engaging member 125 engages with the second leading blade driving member 123 that has been rotated in the counterclockwise direction by the leading blade setting member 152. The rotation of the second leading blade driving member 123 in the clockwise direction by the biasing force of the leading blade driving spring 124 is constrained thereby. When the electric power to the electromagnet 8a for the leading blades is stopped, the first engaging member 125 releases the engagement with the second leading blade driving member 123. Through this, the second leading blade driving member 123 is rotated in the clockwise direction by the biasing force of the leading blade driving spring 124.

(Trailing Blade Driving Portion)

The trailing blade driving portion for driving the trailing blades 300 will be explained next. The trailing blade driving portion, as illustrated in FIG. 1A, is structured from a first trailing blade driving member 131, a second trailing blade driving member 132, and a second engaging member 133. The trailing blade driving portion is provided on the +Z side surface of the base plate 100.

The first trailing blade driving member 131 drives, through the biasing force of a trailing blade setting spring (not shown), the trailing blades 300 from a state wherein the opening 101 is closed to a state wherein it is open. The first trailing blade driving member 131 is supported rotatably on a shaft 113. Moreover, the first trailing blade driving member 131 is biased in the counterclockwise direction by the trailing blade setting spring. The trailing blade setting spring is, for example, a coil spring. The trailing blade driving member 131 has a driving pin 131a.

The driving pin 131a is provided on the −Z side surface of the first trailing blade driving member 131, and is inserted into an elongated hole (not shown) that is formed in the base plate 100. The elongated hole of the base plate 100 is formed in an arc shape, facing in the downward direction in FIG. 1. The elongated hole of the base plate 100 functions as a guide for the movement of the driving pin 131a. Moreover, the driving pin 131a is connected to the trailing blades 300 in the blade chamber that encloses the trailing blades 300. Consequently, the trailing blades 300 are deployed or stacked together in accordance with the rotation of the first trailing blade driving member 131. In the present example, when the first trailing blade driving member 131 rotates in the clockwise direction so that the driving pin 131a moves from the top end to the bottom end of the elongated hole, the trailing blades 300 are deployed, to close the opening 101. When the first trailing blade driving member 131 rotates in the counterclockwise direction so that the driving pin 131a moves from the bottom end to the top end of the elongated hole, the trailing blades 300 stack together, to open the opening 101.

The second trailing blade driving member 132 causes the first trailing blade driving member 131 to undergo following motion, to drive the trailing blades 300 from a state wherein the opening 101 is open to a state wherein it is closed. The second trailing blade driving member 132 is supported rotatably on a shaft 113. The second trailing blade driving member 132 is biased in the clockwise direction by a trailing blade driving spring (not shown). The trailing blade driving spring is, for example, a coil spring that is fitted on the shaft 113. The second trailing blade driving member 132 is rotated in the clockwise direction in accordance with the first trailing blade driving member 131 by the biasing force of the trailing blade driving spring. When the driving pin 131a of the first trailing blade driving member 131 arrives at the bottom end of the elongated hole, the rotation of the second trailing blade driving member 132 is stopped. The trailing blades 300 close the opening 101 thereby. The biasing force of the trailing blade driving spring is greater than the biasing force of the trailing blade setting spring, so the second trailing blade driving member 132 is able to rotate the first trailing blade driving member 131 in the clockwise direction against the biasing force of the trailing blade setting spring through the biasing force of the trailing blade driving spring. The second trailing blade driving member 132 has a pushed portion 132a.

The pushed portion 132a is pushed by the pushing portion 153a of the trailing blade setting member 153. Through this, the second trailing blade driving member 132 is rotated in the counterclockwise direction against the biasing force of the trailing blade driving spring.

When the application of power to an electromagnet 8b for the trailing blades has been started, the second engaging member 133 engages with the second trailing blade driving member 132 that has been rotated in the counterclockwise direction by the trailing blade setting member 153. The rotation of the second trailing blade driving member 132 in the clockwise direction by the biasing force of the trailing blade driving spring is constrained thereby. When the electric power to the electromagnet 8b for the trailing blades is stopped, the second engaging member 133 releases the engagement with the second trailing blade driving member 132. Through this, the second trailing blade driving member 132 is rotated in the clockwise direction by the biasing force of the trailing blade driving spring.

(Switching Portion)

In a state wherein the leading blades 200 have opened the opening 101, the switching portion constrains the counterclockwise rotation of the first leading blade driving member 122 of the leading blade driving portion. The operation of the focal plane shutter 1 is switched to a normally closed mode, a normally open mode, or an electronic mode depending on whether or not the counterclockwise rotation of the first leading blade driving member 122 is constrained by the switching portion. The switching portion, as depicted in FIG. 1A, is structured from a first constraining member 127 and a switching actuator 128. The switching portion is provided on the +Z side surface of the base plate 100.

The first constraining member 127 engages the first leading blade driving member 122 of the leading blade driving portion to constrain the rotation of the first leading blade driving member 122 in the counterclockwise direction. The first constraining member 127 is supported rotatably on a shaft 111. The first constraining member 127 has a connecting portion 127a and a constraining portion 127b.

The connecting portion 127a connects with a rotating portion 128a of the switching actuator 128. Because the connecting portion 127a connects with a rotating portion 128a of the switching actuator 128, the first constraining member 127 rotates linked with the rotating portion 128a. Specifically, when the rotating portion 128a rotates in the clockwise direction centered on the shaft 128b, the first constraining member 127 rotates in the counterclockwise direction. Moreover, when the rotating portion 128a rotates in the counterclockwise direction centered on the shaft 128b, the first constraining member 127 rotates in the clockwise direction.

The constraining portion 127b engages the engaged portion 122a of the first leading blade driving member 122. The rotation of the first leading blade driving member 122 in the counterclockwise direction through the biasing force of the leading blade setting spring is constrained through the constraining portion 127b engaging the engaged portion 122a through being positioned on the path of rotation of the engaged portion 122a.

The switching actuator 128 is an electromagnetic actuator that has a rotating portion 128a. The rotating portion 128a rotates the first constraining member 127 through rotating centered on the shaft 128b. In the present example, when the rotating portion 128a rotates in the counterclockwise direction so that the first constraining member 127 rotates in the clockwise direction, the constraining portion 127b of the first constraining member 127 is positioned on the path of rotation of the engaged portion 122a of the first leading blade driving member 122, to engage the first leading blade driving member 122. Through this, the rotation of the first leading blade driving member 122 in the counterclockwise direction by the biasing force of the leading blade setting spring is constrained, so that the leading blades 200 maintain the state wherein the opening 101 is open. On the other hand, when the rotating portion 128a rotates in the clockwise direction so that the first constraining member 127 rotates in the counterclockwise direction, the constraining portion 127b of the first constraining member 127 is removed from the path of rotation of the engaged portion 122a of the first leading blade driving member 122, enabling release of the engagement of the first leading blade driving member 122. Through this, the first leading blade driving member 122 is rotated in the counterclockwise direction by the biasing force of the leading blade setting spring, so that the leading blades 200 close the opening 101.

(Charging Portion)

The charging portion will be explained next. In the charging portion, the second leading blade driving member 123 applies, to the leading blade driving spring 124, the biasing force for driving the leading blades 200, and the second trailing blade driving member 132 applies, to the trailing blade driving spring, the biasing force for driving the trailing blades 300. The charging portion is structured from a setting portion and a setting driving portion 149. The setting portion pushes the second leading blade driving member 123 and the second trailing blade driving member 132. The setting driving portion 149 drives the setting portion. The charging portion is provided on the +Z side surface of the base plate 100.

The setting portion, as depicted in FIG. 1A, is structured from a setting lever 151, a leading blade setting member 152, and a trailing blade setting member 153. The setting lever 151 is supported rotatably on a shaft 114. Moreover, the setting lever 151 is biased in the counterclockwise direction by the biasing force of a biasing spring (not shown). This biasing spring is, for example, a coil spring. The setting lever 151 rotates in the clockwise direction, against the biasing force in the counterclockwise direction, through the supported portion 151a being pressed by the charging member 145 of the setting driving portion 149.

The leading blade setting member 152 pushes the second leading blade driving member 123 through rotating linked with the setting lever 151. The leading blade setting member 152 is supported rotatably on the shaft 115. The leading blade setting member 152 is connected to the setting lever 151 through a first connecting member 154 and a second connecting member 155. The leading blade setting member 152 is linked to the setting lever 151, to rotate in the same direction as the direction of rotation of the setting lever 151. The leading blade setting member 152 has a pushing portion 152a.

When the leading blade setting member 152 rotates in the clockwise direction, the pushing portion 152a pushes the pushed portion 123b of the second leading blade driving member 123. The second leading blade driving member 123 rotates in the counterclockwise direction, against the biasing force of the leading blade driving spring 124, through the pushed portion 123b being pushed. Through this, the biasing force for driving the leading blades 200 is applied to the leading blade driving spring 124. Note that when the focal plane shutter 1 is operating in the electronic mode, the state wherein the biasing force is applied to the leading blade driving spring 124 is maintained, and thus even if the leading blade setting member 152 has rotated in the clockwise direction, the pushing portion 152a does not push the pushed portion 123b of the second leading blade driving member 123.

The trailing blade setting member 153, through rotating linked with the setting lever 151, pushes the second trailing blade driving member 132. The trailing blade setting member 153 is supported rotatably on a shaft 116. The trailing blade setting member 153 is connected to the setting lever 151 through a first connecting member 154. Through this, the trailing blade setting member 153 is linked to the setting lever 151, to rotate in the same direction as the direction of rotation of the setting lever 151. The trailing blade setting member 153 has a pushing portion 153a.

When the trailing blade setting member 153 rotates in the clockwise direction, the pushing portion 153a pushes the pushed portion 132a of the second trailing blade driving member 132. The second trailing blade driving member 132 is rotated in the counterclockwise direction against the biasing force of the trailing blade driving spring by the pushing of the pushed portion 132a being. Through this, the biasing force for driving the trailing blades 300 is applied to the trailing blade driving spring.

As depicted in FIG. 1B, the setting driving portion 149 is structured from a charging motor 141, a sensor plate 142, a sensor 143, a charging cam 144, and a charging member 145.

The charging motor 141 is, for example, a DC (direct current) motor. The charging motor 141 causes the sensor plate 142 and the charging cam 144 to rotate, through a transmitting member (not shown), such as a gear, through a signal from a controlling portion 7 of the imaging device 10. The charging motor 141 is driven by a first driving voltage for applying a biasing force to the leading blade driving spring 124 and the trailing blade driving spring when the focal plane shutter 1 is operating in the normally open mode or the normally closed mode. Moreover, the charging motor 141 is driven by a second driving voltage, which is less than the first driving voltage, for applying a biasing force to the trailing blade driving spring, when the focal plane shutter 1 is operating in the electronic mode.

The sensor plate 142 is rotated by the charging motor 141, through a transmitting member, centered on a shaft 146. The sensor plate 142 is formed in a disk shape from which a portion is missing in a fan shape.

The sensor 143 is, for example, an optical sensor. The sensor 143 detects the position of the leading blade setting member 152 and the trailing blade setting member 153 through detecting the position of the fan-shaped missing part of the sensor plate 142. This makes it possible to detect the retraction of the leading blade setting member 152 from the path of rotation of the second leading blade driving member 123. It also enables detection of retraction of the trailing blade setting member 153 from the path of rotation of the second trailing blade driving member 132.

The charging cam 144 is rotated, by the charging motor 141, through a transmitting member, centered on the shaft 146. The rotation of the charging cam 144 and the rotation of the sensor plate 142 are synchronized.

The charging member 145 is rotated by the charging cam 144 centered on a shaft 147, to push the setting lever 151. The charging member 145 has a contacting portion 145*a* and a supporting portion 145*b*.

The contacting portion 145*a* contacts the outer peripheral surface of the charging cam 144. The position of the contacting portion 145*a* in the X axial direction moves in accordance with the rotation of the charging cam 144. Through this, the charging member 145 rotates, centered on the shaft 147, in accordance with the rotation of the charging cam 144.

The supporting portion 145*b* supports the setting lever 151 at a supported portion 151*a* of the setting lever 151. The setting lever 151 is biased in the counterclockwise direction, and thus when the contacting portion 145*a* contacts the bottom dead point of the charging cam 144, the supporting portion 145*b* is pressed by the supported portion 151*a* of the setting lever 151, and contacts a stopper 148. When the charging cam 144 rotates in the counterclockwise direction, and the position contacted by the contacting portion 145*a* has moved from the bottom dead point to the top dead point of the charging cam 144, then, as depicted in FIG. 1B, the charging member 145 rotates in the clockwise direction, and the supporting portion 145*b* presses the supported portion 151*a* of the setting lever 151. Through this, the setting lever 151 rotates in the clockwise direction against the biasing force in the counterclockwise direction. Through the rotation of the setting lever 151 in the clockwise direction, the leading blade setting member 152 and the trailing blade setting member 153 rotate in the clockwise direction, so the biasing force is applied to the leading blade driving spring 124 and the trailing blade driving spring.

When the charging cam 144 rotates further in the counterclockwise direction so that the position contacted by the contacting portion 145*a* moves from the top dead point to the bottom dead point of the charging cam 144, the charging member 145 is pressed by the supported portion 151*a* of the setting lever 151, to rotate in the counterclockwise direction.

The rotation of the charging member 145 in the counterclockwise direction is through the supporting portion 145*b* contacting the stopper 148. On the other hand, the setting lever 151 rotates in the counterclockwise direction through the biasing force in the counterclockwise direction. Through the setting lever 151 rotating in the counterclockwise direction, the leading blade setting member 152 rotates in the counterclockwise direction, to retract from the path of rotation of the second leading blade driving member 123. Moreover, the trailing blade setting member 153 also rotates in the counterclockwise direction to retract from the path of rotation of the second trailing blade driving member 132. Note that the rotation of the setting lever 151 in the counterclockwise direction is also stopped through the supporting portion 145*b* contacting the stopper 148.

The voltage for driving the charging motor 141 and the rotation of the trailing blade setting member 153 and the second trailing blade driving member 132 will be explained here. When the focal plane shutter 1 is operating in the normally open mode or the normally closed mode, the leading blades 200 open the opening 101 from a state wherein the leading blades 200 had closed the opening 101, and the trailing blades 300 close the opening 101, and so the charging portion applies a biasing force to the leading blade driving spring 124 and the trailing blade driving spring. When the focal plane shutter 1 is operating in the electronic mode, the trailing blades 300 close the opening 101, without an operation by the leading blades 200, from a state wherein the leading blades 200 and the trailing blades 300 have opened the opening 101, and thus the charging portion applies a biasing force to only the trailing blade driving spring. Consequently, the electronic mode, the load on the charging motor 141 is less than it is in the normally open mode or the normally closed mode.

In the electronic mode, the load on the charging motor 141 is small, so if the charging motor 141 were driven by the first driving voltage for applying the biasing force to the leading blade driving spring 124 and the trailing blade driving spring, the driving force of the charging motor 141 would be excessively large, and the trailing blade setting member 153 and the second trailing blade driving member 132 would rotate excessively. Excessive rotation of the trailing blade setting member 153 and of the second trailing blade driving member 132 would produce a shift in position of the members that structure the setting portion and the trailing blade driving portion, causing the operation of the focal plane shutter 1 to be unstable.

In the present example, when the focal plane shutter 1 is operating in the electronic mode, the charging motor 141 is driven by a second driving voltage, which is smaller than the first driving voltage, to apply the biasing force to the trailing blade driving spring. Through this, the excessive rotation of the trailing blade setting member 153 and the second trailing blade driving member 132 in the electronic mode is prevented, enabling achievement of stabilized operation of the focal plane shutter 1.

(Breaking Portion)

The breaking portion brakes the leading blades 200 when the leading blades 200 open the opening 101. The breaking portion is structured from a breaking member 161, and a brake driving portion 165 that has a motor 162 and a first cam member 163. The breaking portion is provided on the +Z side surface of the base plate 100.

The breaking member 161 brakes the leading blades 200 when the leading blades 200 open the opening 101. Specifically, the when the first leading blade driving member 122 rotates in the clockwise direction together with the second leading blade driving member 123, the braking member 161 makes sliding contact with the driving pin 122c of the first leading blade driving member 122, to brake the motion of the driving pin 122c. The driving pin 122c is connected to the leading blades 200, thus enabling the braking member 161 to brake the leading blades 200.

The braking member 161 is supported rotatably on a shaft 117. Moreover, the braking member 161, when rotating centered on the shaft 117, is subject to rotational resistance through friction from a friction member that is provided on the shaft 117. The friction member is, for example, a washer. The brake member 161 has a sliding portion 161a and a pushed portion 161b.

The sliding portion 161a makes sliding contact with the driving pin 122c immediately prior to the driving pin 122c of the first leading blade driving member 122 arriving at the bottom end of the elongated hole of the base plate 100. In this case, the braking member 161 is pushed by the driving pin 122c, and rotates in the counterclockwise direction. The braking member 161 is subject to rotational resistance through the friction with the friction member, and thus brakes the driving pin 122c. That is, the braking member 161 brakes the leading blades 200 through friction with the friction member. Because the braking member 161 brakes the leading blades 200 through friction with the friction member, the braking force of the braking member 161 can be increased easily through increasing the frictional force between the braking member 161 and the friction member.

The braking member 161 is removed from the path of rotation of the driving pin 122c through being pushed by the driving pin 122c. Consequently, when the first leading blade driving member 122 rotates in the counterclockwise direction and the leading blades 200 close the opening 101, there is no collision between the braking member 161 and the driving pin 122c.

The pushed portion 161b is pushed by the first cam member 163 of the brake driving portion 165. Through this, the braking member 161 rotates in the clockwise direction, to move to a position for braking the leading blades 200.

The brake driving portion 165 moves, to the position for braking the leading blades 200, the braking member 161 that has been removed from the path of rotation of the driving pin 122c of the first leading blade driving member 122, independently from the leading blade driving portion, the trailing blade driving portion, and the charging portion. Here "independently of the leading blade driving portion, the trailing blade driving portion, and the charging portion" means that it can operate as appropriate without being linked to any member that structures the leading blade driving portion, the trailing blade driving portion, or the charging portion. Moreover, the position for the braking member 161 to brake the leading blades 200 is the position of the braking member 161 wherein the sliding portion 161a of the braking member 161 makes sliding contact with the driving pin 122c.

The motor 162 for the brake driving portion 165 is, for example, a DC motor. The DC motor 162 rotates a first cam member 163 through a gear (not shown). The first cam member 163 rotates centered on a shaft 164, to push the pushed portion 161b of the braking member 161. The braking member 161 that is pushed by the first cam member 163 rotates in the clockwise direction, to move to the position for braking the leading blades 200. Moreover, the first cam member 163, after moving the braking member 161 to the position for braking the leading blades 200, moves away from the braking member 161. Through this, the braking member 161 is able to rotate in the counterclockwise direction when it has made sliding contact with the driving pin 122c of the first leading blade driving member 122.

Through the above, the brake driving portion 165 is able to move the braking member 161 to the position for braking the leading blades 200, through rotation of the motor 162, independently of the leading blade driving portion, the trailing blade driving portion, and the charging portion. Because the brake driving portion 165 is independent of the leading blade driving portion, the trailing blade driving portion, and the charging portion, it can move the braking member 161 to the position for braking the leading blades 200, independently of the operation of the leading blade driving portion, the trailing blade driving portion, and the charging portion. For example, when the focal plane shutter 1 is operating in the normally open mode, the brake driving portion 165 can move the braking member 161 to the position for braking the leading blades 200 after the first leading blade driving member 122 has rotated in the counterclockwise direction and the leading blades 200 have closed the opening 101.

(Imaging Device)

An imaging device 10 that is equipped with the focal plane shutter 1 will be explained in reference to FIG. 2. The imaging device 10 is, for example, a digital still camera.

The imaging device 10 is equipped with a focal plane shutter 1, a release button 5, a select button (not shown), an imaging element 6, and a controlling portion 7. Moreover, the imaging device 10 is equipped with known structural members (not shown) such as an imaging lens, a power supply, and the like.

The release button 5 is a button that is pressed by a user in order to capture a still image. The imaging device 10 begins imaging when the release button 5 is pressed. The select button is a button for the user to select the operation of the imaging device 10, that is, the operation of the focal plane shutter 1. The user selects one mode from among the normally open mode, the normally closed mode, and the electronic mode.

The imaging element 6 captures an image of the photographic subject that is focused by the imaging lens through the opening 101 of the base plate 100. Additionally, the imaging element 6 outputs, to the controlling portion 7, imaging data that represents the image of the photographic subject. The imaging element 6 is an image sensor such as a CCD (charge-coupled device), a CMOS (complementary metal oxide semiconductor), or the like.

The controlling portion 7 is equipped with a CPU (central processing unit), a memory, a timer, and the like. The controlling portion 7 controls the operation of the charging motor 141 of the charging portion, the switching actuator 128 of the switching portion, the motor 162 of the braking portion, the imaging element 6, the electromagnet 8a for the leading blades, the electromagnet 8b for the trailing blades, and the like.

(Operation of the Focal Plane Shutter)

The operation of the focal plane shutter 1, provided in the imaging device 10, will be explained next. The focal plane shutter 1 operates in a normally open mode, a normally closed mode, and an electronic mode. The focal plane shutter 1 operates in the mode selected by the user.

The operation of the focal plane shutter 1 in the normally open mode will be explained first in reference to FIG. 1A through FIG. 13B. Note that in FIG. 3 through FIG. 13B, for ease in understanding, reference symbols are shown for only those members relevant to the respective operations.

(Initial State)

When the imaging device 10 is started up, the focal plane shutter 1 will be in an initial state as described below. Note that the initial state is the same for all three modes. As depicted in FIG. 1A, in the initial state, the leading blades 200 are positioned on the −Y side of the opening 101, in a state wherein they are stacked together. The trailing blades 300 are positioned on the +Y side of the opening 101 in a state wherein they are stacked together. As a result, the opening 101 is open. Moreover, as depicted in FIG. 1A, the first leading blade driving member 122 of the leading blade driving portion is engaged by the first constraining member 127 of the switching portion. The second leading blade driving member 123 of the leading blade driving portion is pushed by the leading blade setting member 152 of the charging portion. That is, a biasing force is applied to the leading blade driving spring 124. As depicted in FIG. 1B, the state wherein the biasing force is applied to the leading blade driving spring 124 is maintained by the contact of the contacting portion 145a of the charging member 145 in the charging portion with the top dead point of the charging cam 144 of the charging portion. Moreover, as depicted in FIG. 1A, the first trailing blade driving member 131 of the trailing blade driving portion is in a state that is rotated in the counterclockwise direction through the biasing force of the trailing blade setting spring. The second trailing blade driving member 132 of the trailing blade driving portion is pushed by the trailing blade setting member 153 of the charging portion, so that a biasing force is applied to the trailing blade driving spring. The biasing force that is applied to the trailing blade driving spring is maintained by the charging portion similarly to the biasing force that is applied to the leading blade driving spring 124. As depicted in FIG. 1A, the braking member 161 of the brake portion is out of the path of rotation of the driving pin 122c of the first leading blade driving member 122.

(Standby State)

When the normally open mode is selected, the focal plane shutter 1 stands by in the initial state until the start of imaging in the imaging device 10.

(Start of Imaging)

The imaging in the imaging device 10 is started through pressing of the release button 5 of the imaging device 10.

(Engagement of the Second Leading Blade Driving Member and the Second Trailing Blade Driving Member)

Figure 3:
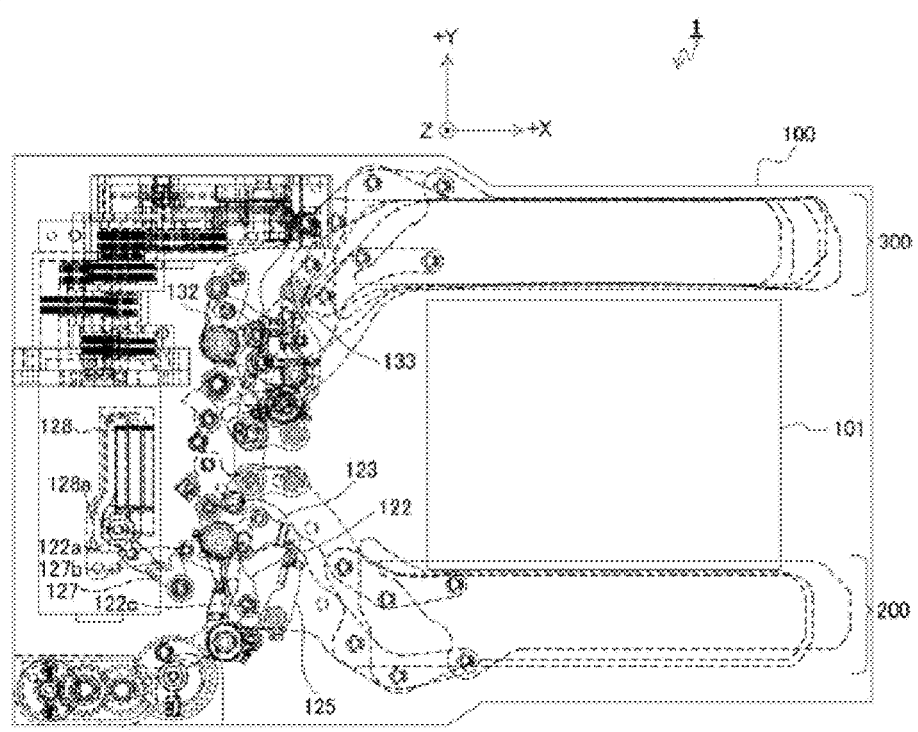
FIG. 3 is a front view illustrating the operation for releasing the engagement of the first leading blade driving member in the normally open mode in the focal plane shutter according to the example according to the present invention.

When the release button 5 of the imaging device 10 is pressed, power is applied to the electromagnet 8a for the leading blades and the electromagnet 8b for the trailing blades, so that, as illustrated in FIG. 3, the first engaging member 125 of the leading blade driving portion and the second engaging member 133 of the trailing blade driving portion engage, respectively, with the second leading blade driving member 123 and the second trailing blade driving member 132. This constrains the rotation of the second leading blade driving member 123 and the second trailing blade driving member 132 in the clockwise direction.

(Release of the First Leading Blade Driving Member)

Figure 4A:
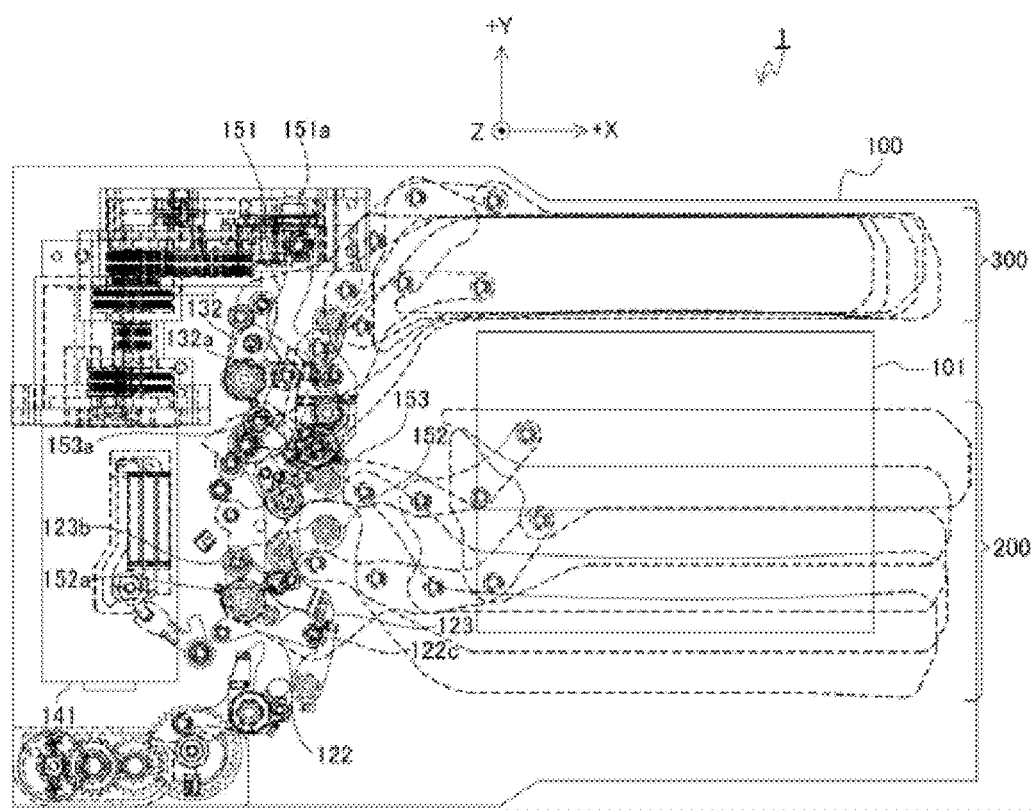
FIG. 4A is a front view showing the operation wherein the leading blade setting member and the trailing blade setting member retract in the normally open mode in the focal plane shutter according to the example according to the present invention.
Figure 5A:
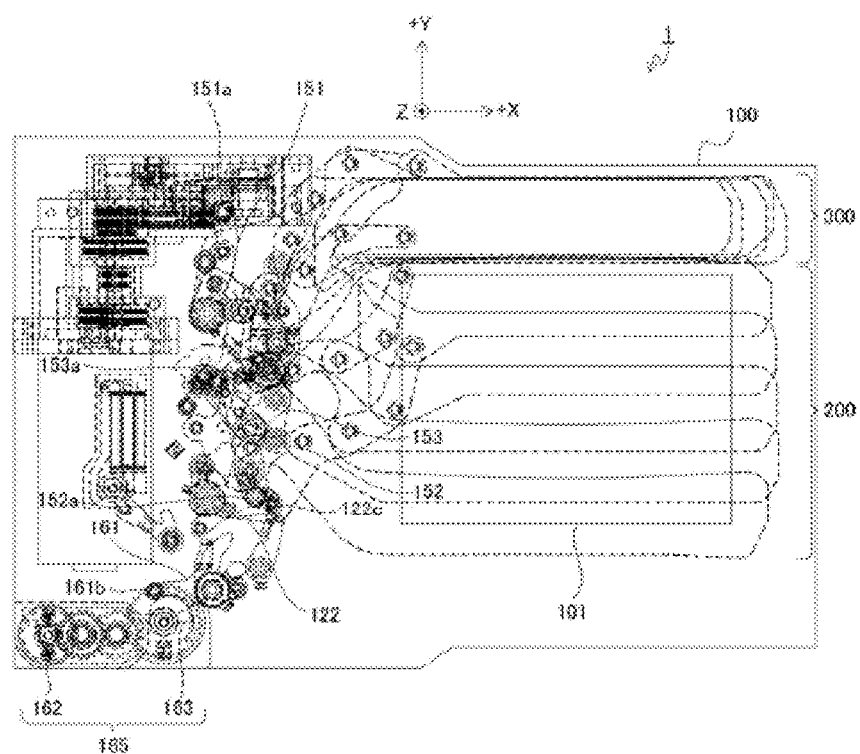
FIG. 5A is a front view showing the operation wherein the leading blade setting member and the trailing blade setting member retract, and the operation wherein the braking member moves, in the normally open mode in the focal plane shutter according to the example according to the present invention.

Moreover, the rotating portion 128a of the switching actuator 128 in the switching portion is rotated in the clockwise direction through application of power to the switching actuator 128. Through this, as depicted in FIG. 3, the first constraining member 127 of the switching portion rotates in the counterclockwise direction, releasing the engagement of the first leading blade driving member 122 by the first constraining member 127. The first leading blade driving member 122 is biased in the counterclockwise direction, and thus the first leading blade driving member 122, as depicted in FIG. 4A and FIG. 5A, rotates in the counterclockwise direction, so the driving pin 122c of the first leading blade driving member 122 moves from the bottom end to the top end of the elongated hole of the base plate 100. The leading blades 200 deploy, to close the opening 101, in accordance with the movement of the driving pin 122c.

(Retraction of the Leading Blade Setting Member and the Trailing Blade Setting Member)

Figure 4B:
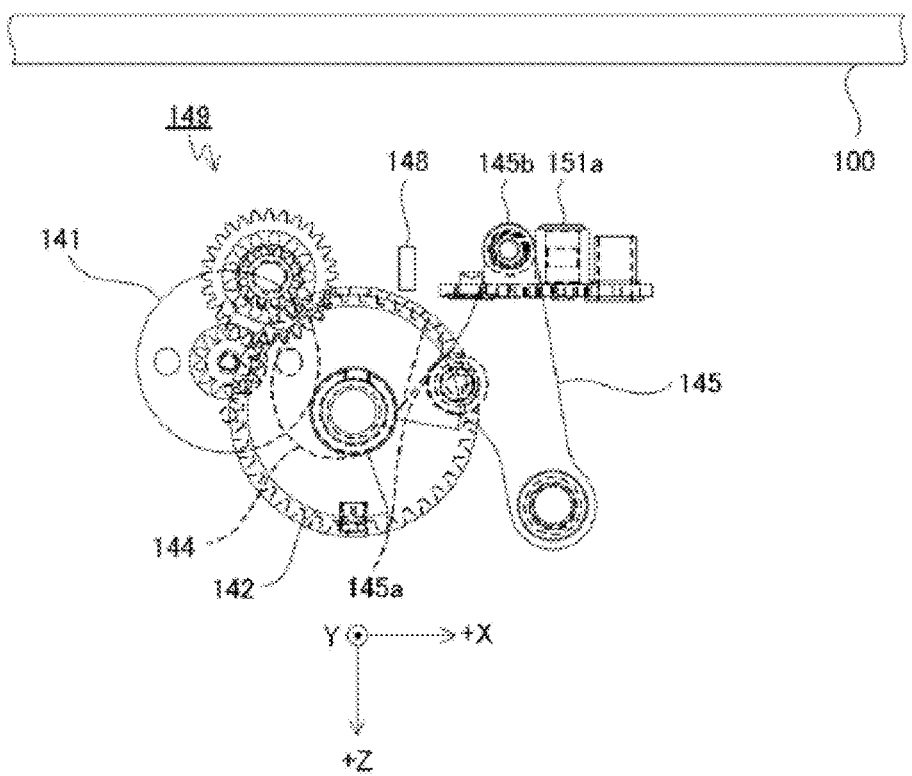
FIG. 4B is a schematic diagram wherein a setting driving portion in the focal plane shutter depicted in FIG. 4A is viewed from the +Y axial direction.
Figure 5B:
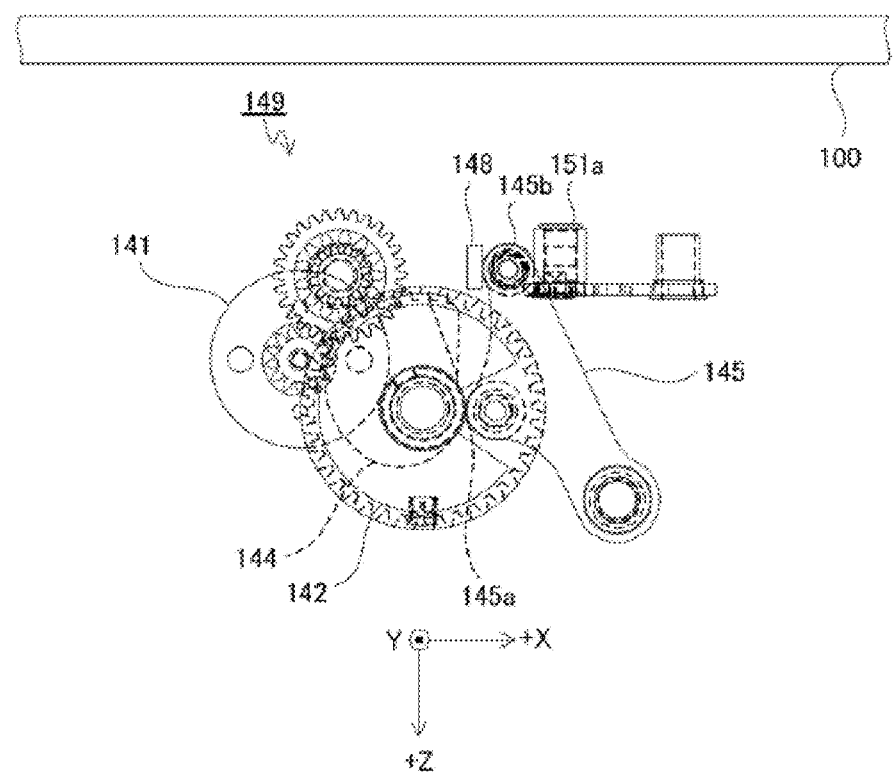
FIG. 5B is a schematic diagram wherein a setting driving portion in the focal plane shutter depicted in FIG. 5A is viewed from the +Y axial direction.

Following this, as depicted in FIG. 4B, the charging cam 144 of the charging portion is rotated in the counterclockwise direction by the charging motor 141 of the charging portion. Through this, as depicted in FIG. 4A, the setting lever 151 of the charging portion rotates in the counterclockwise direction. Accompanying the rotation of the setting lever 151 in the counterclockwise direction, the leading blade setting member 152 rotates in the counterclockwise direction to retract from the path of rotation of the second leading blade driving member 123. The trailing blade setting member 153, in the same manner as with the leading blade setting member 152, retracts from the path of rotation of the second trailing blade driving member 132. As depicted in FIG. 5A and FIG. 5B, when the charging cam 144 rotates to the bottom dead point and the rotation of the setting lever 151 is stopped by the stopper 148 of the charging portion, the retraction, from the paths of rotation, of the leading blade setting member 152 and the trailing blade setting member 153, is also complete.

(Movement of the Braking Member)

Figure 6:
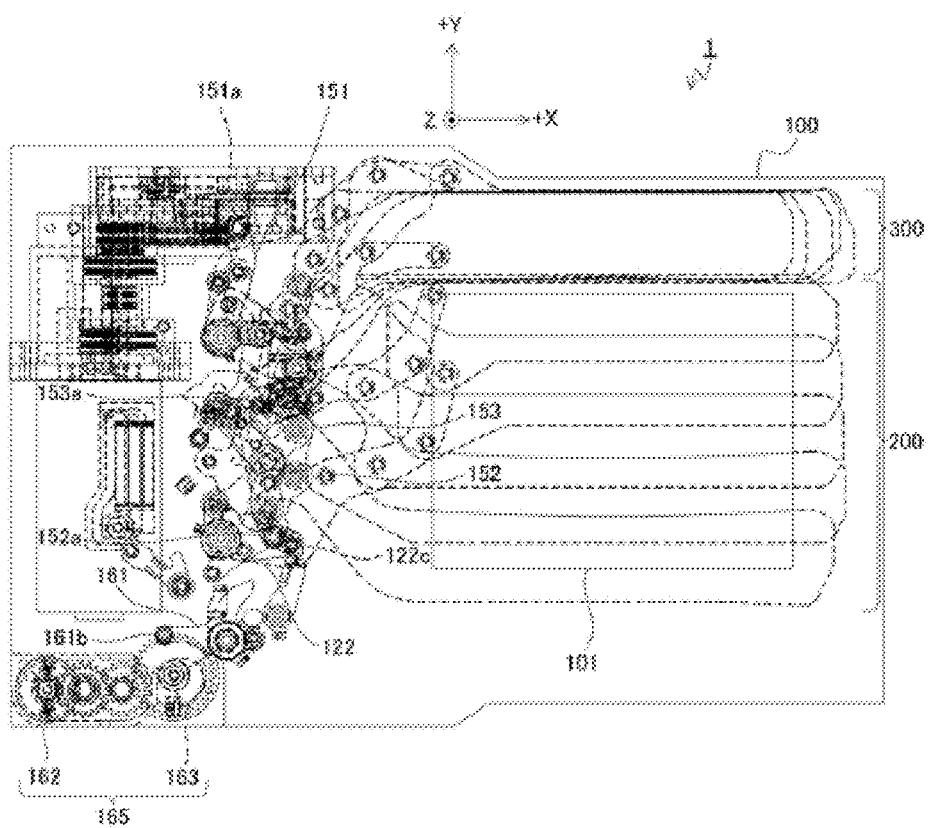
FIG. 6 is a front view depicting the operation wherein the braking member moves in that the normally open mode of the focal plane shutter according to the example according to the present invention.

Moreover, the first cam member 163 of the brake driving portion 165 is rotated by the motor 162 of the brake driving portion 165, to push the braking member 161. The braking member 161 that is pushed by the first cam member 163 rotates in the clockwise direction, as depicted in FIG. 5A, to move to the position for braking the leading blades 200. In this case, the driving pin 122c of the first leading blade driving member 122 is released from the engagement with the first leading blade driving member 122, so as to already have passed the position of sliding contact with the sliding portion 161a of the braking member 161. Consequently, there is no collision between the braking member 161 and the driving pin 122c that moves in order to close the opening 101. After the first cam member 163 has moved to the braking member 161 to the position for braking the leading blades 200, it moves away from the braking member 161, as illustrated in FIG. 6.

(Exposing Operation)

The exposing operation is started next.

(Exposing Operation of the Leading Blades)

Figure 7:
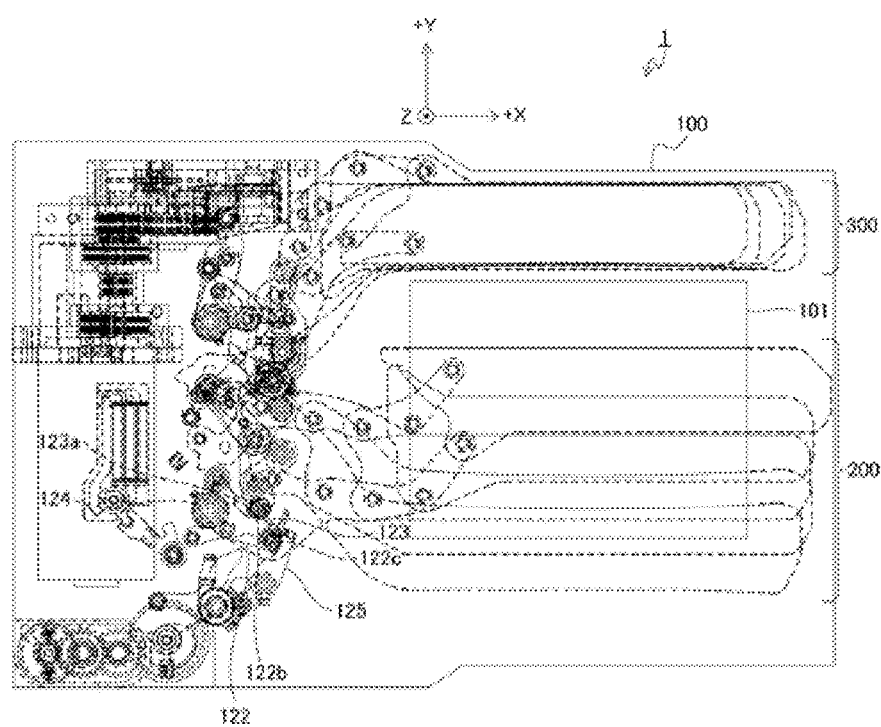
FIG. 7 is a front view showing the exposing operation for the leading blade in the normally open mode in the focal plane shutter according to the example according to the present invention.

The power that is applied to the electromagnet 8a for the leading blades is stopped, to release the engagement of the second leading blade driving member 123 by the first engaging member 125. As illustrated in FIG. 7, when the engagement of the second leading blade driving member 123 is released, the second leading blade driving member 123 is rotated in the clockwise direction by the biasing force of the leading blade driving spring 124. When the second leading blade driving member 123 rotates in the clockwise direction, the first leading blade driving member 122 moves following the second leading blade driving member 123, and thus the first leading blade driving member 122 also rotates in the clockwise direction. Through this, the driving pin 122c of the first leading blade driving member 122 moves from the top end to the bottom end of the elongated hole of the base plate 100. Accompanying the movement of the driving pin 122c, the leading blades 200 open the opening 101.

Figure 8:
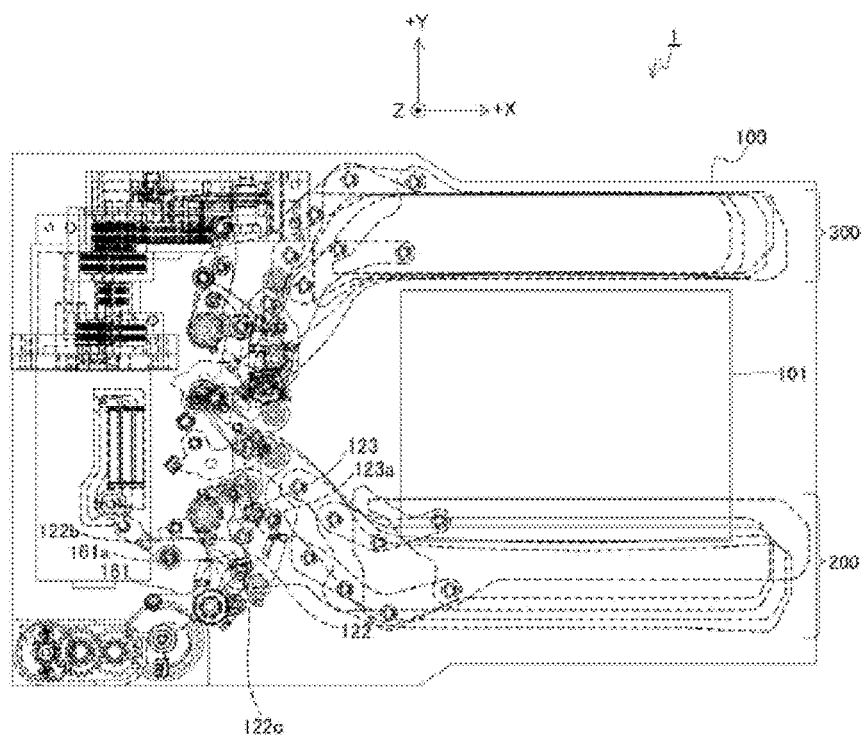
FIG. 8 is a front view showing the operation for braking the leading blade in the normally open mode in the focal plane shutter according to the example according to the present invention.

As depicted in FIG. 8, the driving pin 122c makes sliding contact with the sliding portion 161a of the braking member 161 immediately prior to arriving at the bottom end, pushing the braking member 161. The braking member 161 is subject to rotational resistance through friction with the friction member, and thus brakes the driving pin 122c, that is, the leading blades 200. The braking member 161 is pushed by the driving pin 122c, to be removed from the path of rotation of the driving pin 122c.

Figure 9:
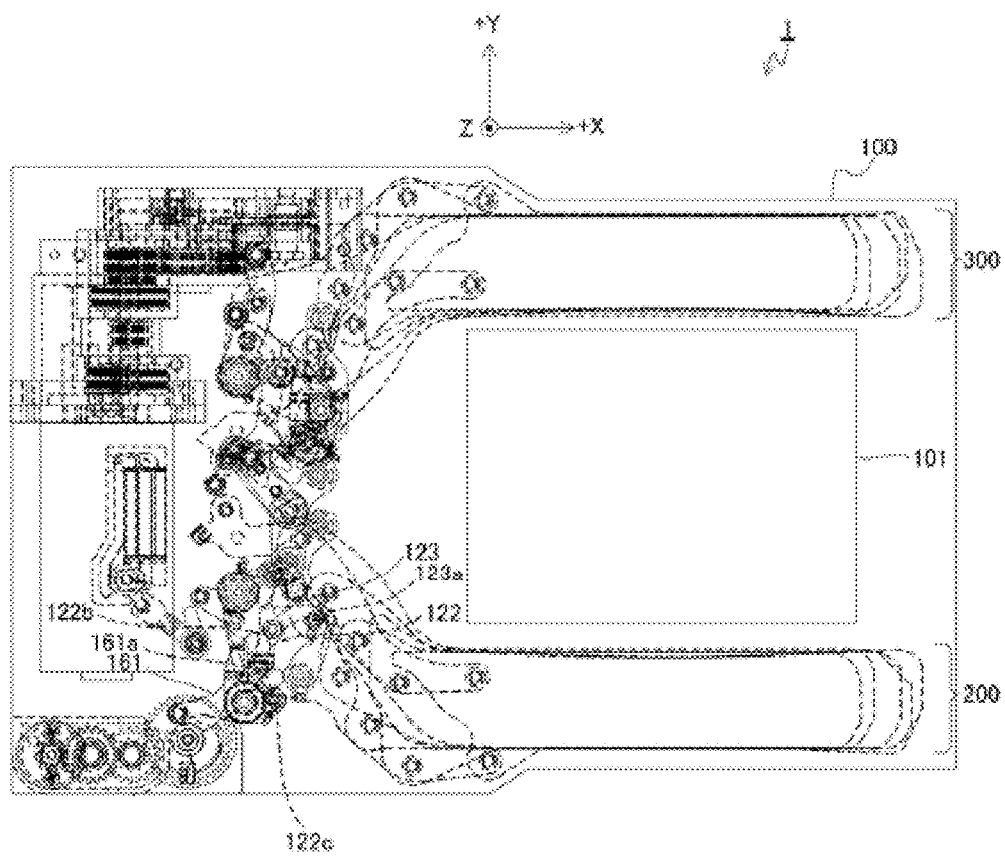
FIG. 9 is a front view showing the exposing operation of the leading blade in the normally open mode in the focal plane shutter according to the example according to the present invention.

As depicted in FIG. 9, the rotation of the first leading blade driving member 122 and of the second leading blade driving member 123 is stopped by the driving pin 122c contacting the bottom end of the elongated hole of the base plate 100. The speed of movement of the leading blades 200 is reduced by the braking by the braking member 161, thus preventing rebound of the leading blades 200 that is produced through the driving pin 122c contacting the bottom end of the elongated hole of the base plate 100.

(Exposing Operation of the Trailing Blades)

Figure 10:
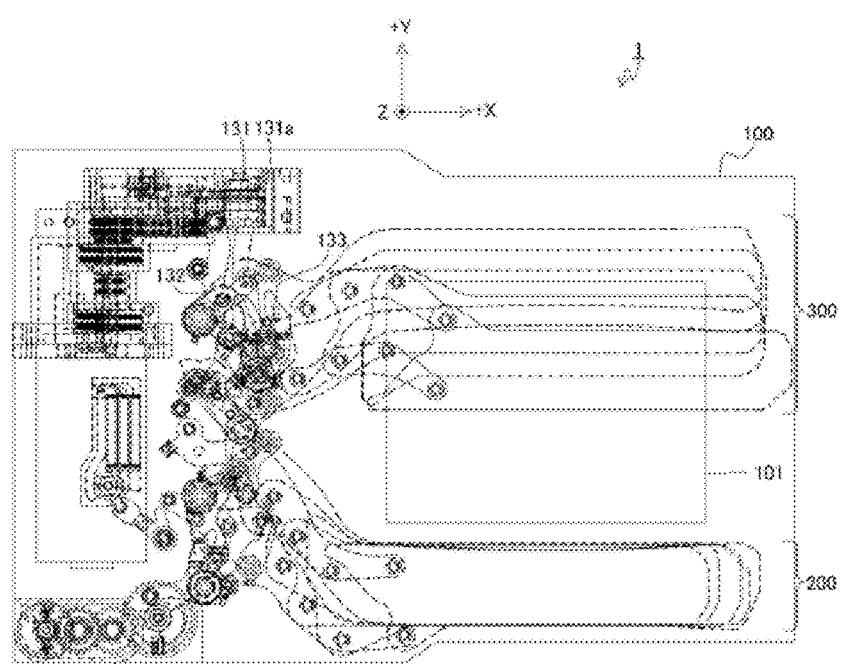
FIG. 10 is a front view showing the exposing operation of the trailing blade in the normally open mode in the focal plane shutter according to the example according to the present invention.

After a prescribed time has elapsed after power to the electromagnet 8a for the leading blades has been stopped, power to the electromagnet 8b for the trailing blades is stopped as well, and the engagement of the second trailing blade driving member 132 by the second engaging member 133 is released. When the engagement of the second trailing blade driving member 132 is released, then, as depicted in FIG. 10, the second trailing blade driving member 132 is rotated in the clockwise direction by the biasing force of the trailing blade driving spring. Through this, the first trailing blade driving member 131 moves following the second trailing blade driving member 132, and the driving pin 131a of the first trailing blade driving member 131 moves from the top end to the bottom end of the elongated hole of the base plate 100. The trailing blades 300 close the opening 101 accompanying the movement of the driving pin 131a.

Figure 11:
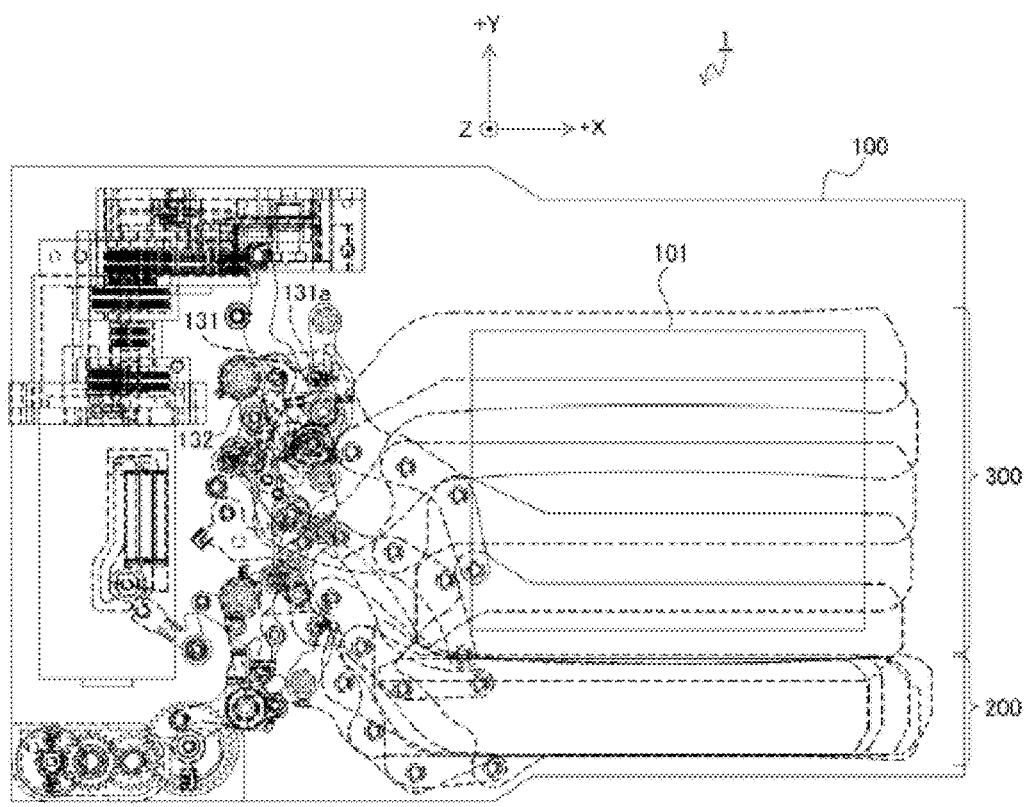
FIG. 11 is a front view showing the exposing operation of the trailing blade in the normally open mode in the focal plane shutter according to the example according to the present invention.

As depicted in FIG. 11, the rotation of the first trailing blade driving member 131 and of the second trailing blade driving member 132 is stopped by contact of the driving pin 131a with the bottom end of the elongated hole of the base plate 100. Through this, the opening 101 is closed by the trailing blades 300.

The exposing operation is completed through the above. An image of the photographic subject is captured by the imaging element 6 of the imaging device 10 while the focal plane shutter 1 is carrying out the exposing operation.

(Engagement of the First Leading Blade Driving Member)

Figure 12:
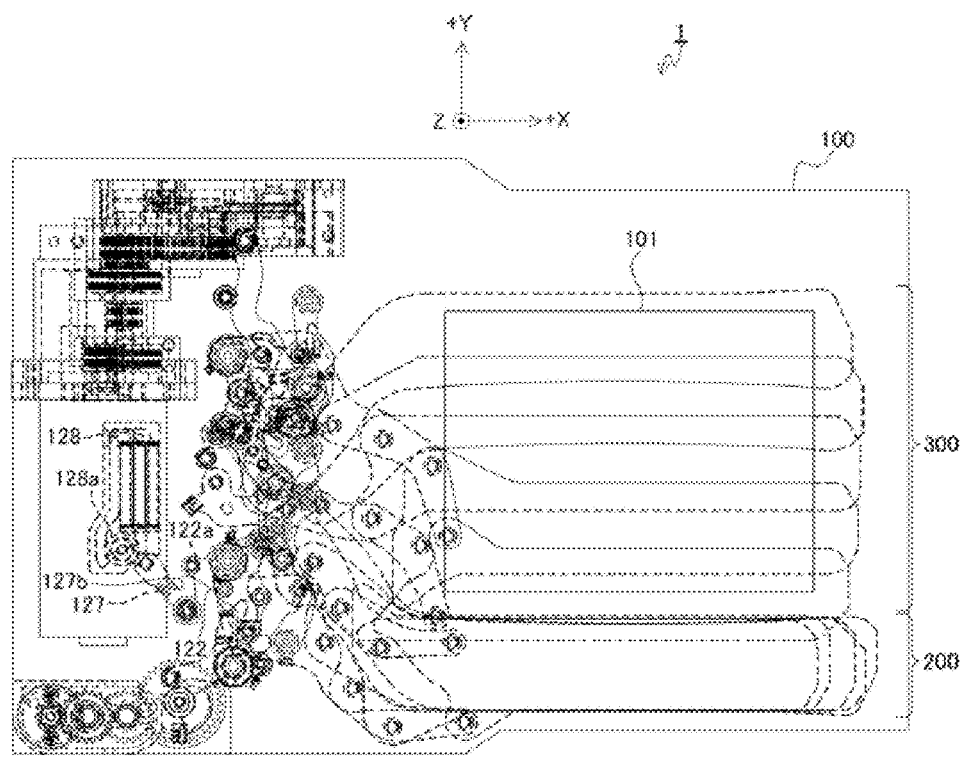
FIG. 12 is a front view illustrating the operation for engaging the first leading blade driving member in the normally open mode in the focal plane shutter according to the example according to the present invention.

After completion of the exposing operation, then, as depicted in FIG. 12, the rotating portion 128a of the switching actuator 128 is rotated in the counterclockwise direction through application of power to the switching actuator 128. Through this, the first constraining member 127 rotates in the clockwise direction to engage the first leading blade driving member 122.

(Charging Operation)

Figure 13A:
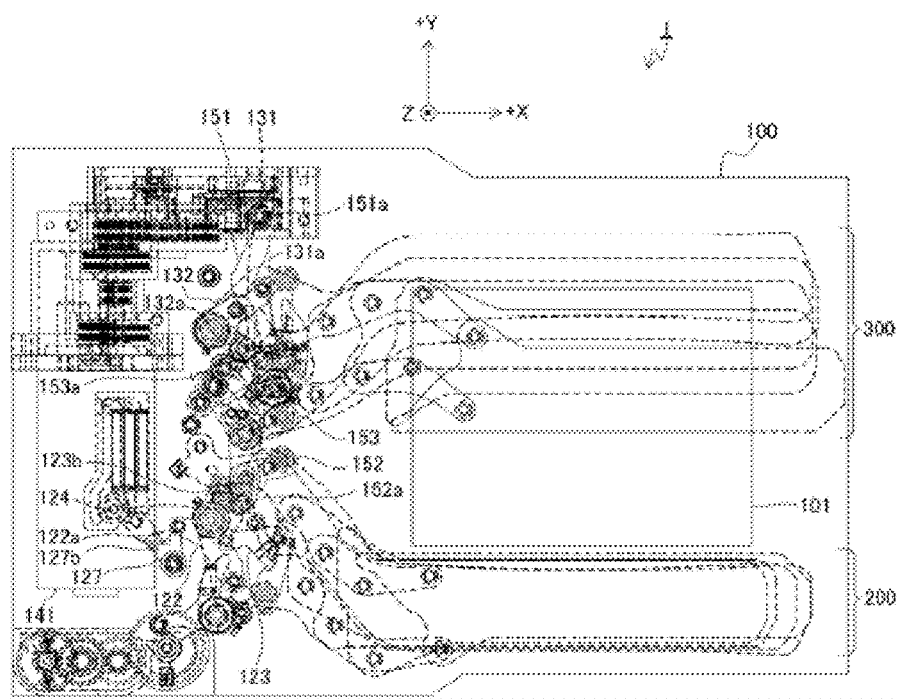
FIG. 13A is a front view showing the charging operation in the normally open mode in the focal plane shutter according to the example according to the present invention.
Figure 13B:
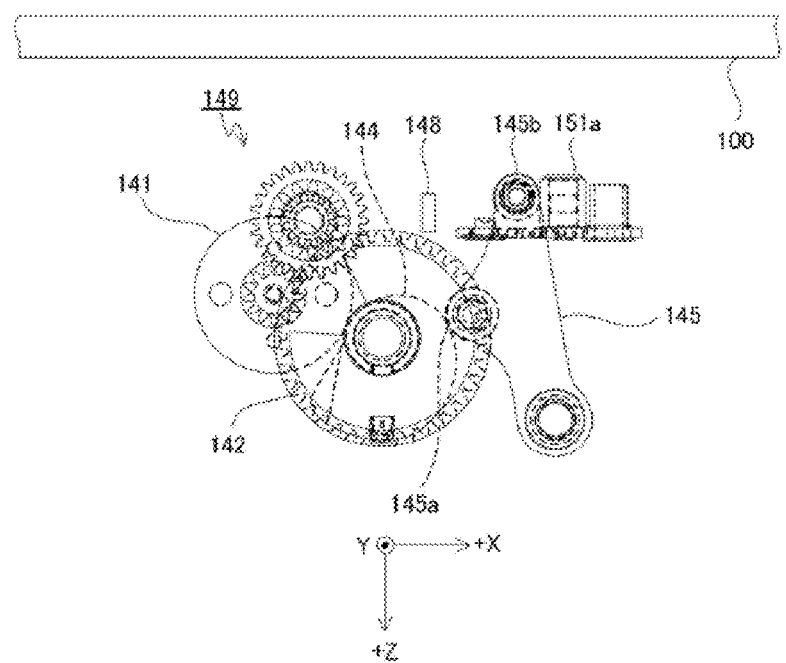
FIG. 13B is a schematic diagram wherein a setting driving portion in the focal plane shutter depicted in FIG. 13A is viewed from the +Y axial direction.

Following this, the focal plane shutter 1 carries out a charging operation, for the subsequent imaging in the imaging device 10. As depicted in FIG. 13B, the charging cam 144 is rotated in the counterclockwise direction by the charging motor 141. In the normally open mode, the charging motor 141 is driven through the first driving voltage for applying the biasing force to the leading blade driving spring 124 and the trailing blade driving spring. As depicted in FIG. 13A, the setting lever 151 is rotated in the clockwise direction by the rotation of the charging cam 144. In accordance with the rotation of the setting lever 151 in the clockwise direction, the leading blade setting member 152 rotates in the clockwise direction, to push the second leading blade driving member 123. The second leading blade driving member 123 that is pushed by the leading blade setting member 152 rotates in the counterclockwise direction against the biasing force of the leading blade driving spring 124. Through this, the biasing force for driving the leading blades 200 is applied to the leading blade driving spring 124. Moreover, the trailing blade setting member 153 also pushes the second trailing blade driving member 132 in accordance with the rotation of the setting lever 151 in the clockwise direction. The second trailing blade driving member 132 rotates in the counterclockwise direction against the biasing force of the trailing blade driving spring. Through this, the biasing force for driving the trailing blades 300 is applied to the trailing blade driving spring. Accompanying the rotation of the second trailing blade driving member 132 in the counterclockwise direction, the first trailing blade driving member 131 rotates in the counterclockwise direction against the biasing force of the trailing blade setting spring. Through this, the trailing blades 300 open the opening 101. Note that because the first constraining member 127 engages the first leading blade driving member 122, the leading blades 200 open the opening 101.

Once the charging operation has been completed, the focal plane shutter 1 returns to the initial state (the standby state), depicted in FIG. 1A and FIG. 1B. The focal plane shutter 1 stands by, in the initial state (the standby state) until the next imaging operation.

As described above, in the brake driving portion 165, the braking member 161 is moved by rotation of the motor 162, independently of the leading blade driving portion, the trailing blade driving portion, and the charging portion. Because the brake driving portion 165 is independent of the leading blade driving portion, the trailing blade driving portion, and the charging portion, when the leading blades 200 are opening the opening 101 in the focal plane shutter 1, the braking member 161 for braking the leading blades 200 can be moved to the position for braking the leading blades 200 after the leading blades 200 have closed the opening 101. The braking member 161, through having a large frictional force with the friction member, is able to brake the leading blades 200 with a large braking force.

The operation of the focal plane shutter 1 in the normally closed mode will be explained next in reference to FIG. 2 and FIG. 14A through FIG. 16B. Note that in FIG. 14A through FIG. 16B, for ease in understanding, reference symbols are shown for only those members relevant to the respective operations.

(Standby State)

Figure 14A:
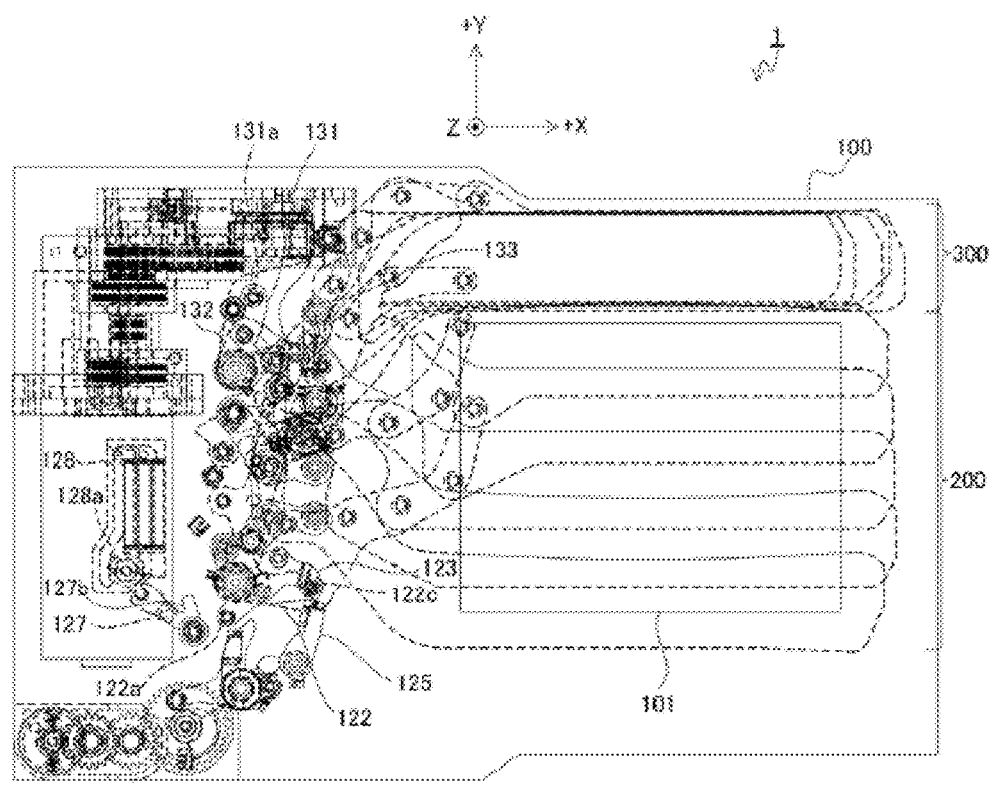
FIG. 14A is a front view depicting a standby state, in the normally closed mode, of a focal plane shutter according to the example according to the present invention.
Figure 14B:
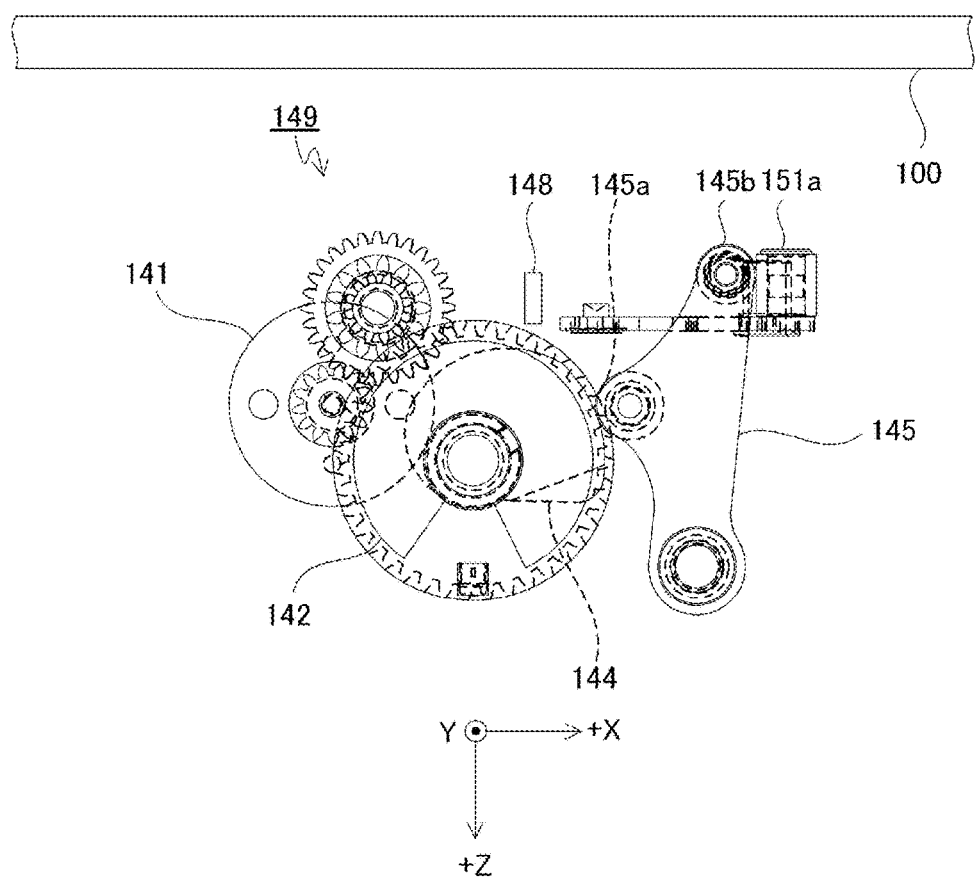
FIG. 14B is a schematic diagram wherein a setting driving portion in the focal plane shutter depicted in FIG. 14A is viewed from the +Y axial direction.

When the normally closed mode is selected, the focal plane shutter 1, from the standby state, releases the engagement of the first leading blade driving member 122, to go to the standby state depicted in FIG. 14A and FIG. 14B. As with the normally open mode, the engagement of the first leading blade driving member 122 is released through rotation of the rotating portion 128a of the switching actuator 128 in the clockwise direction. Through this, the driving pin 122c of the first leading blade driving member 122 moves from the bottom end to the top end of the elongated hole of the base plate 100, and the leading blades 200 close the opening 101. The focal plane shutter 1 stands by in the standby state until the beginning of imaging in the imaging device 10.

(Start of Imaging)

The imaging in the imaging device 10 is started through pressing of the release button 5 of the imaging device 10.

(Engagement of the Second Leading Blade Driving Member and the Second Trailing Blade Driving Member)

When the release button 5 of the imaging device 10 is pressed, then, in the same manner as with the normally open mode, the supply of power is started to the electromagnet 8a for the leading blades and to the electromagnet 8b for the trailing blades. Through this, the second leading blade driving member 123 and the second trailing blade driving member 132 become engaged, constraining the rotation of the second leading blade driving member 123 and of the second trailing blade driving member 132 in the clockwise direction.

(Retraction of the Leading Blade Setting Member and the Trailing Blade Setting Member)

Figure 15A:
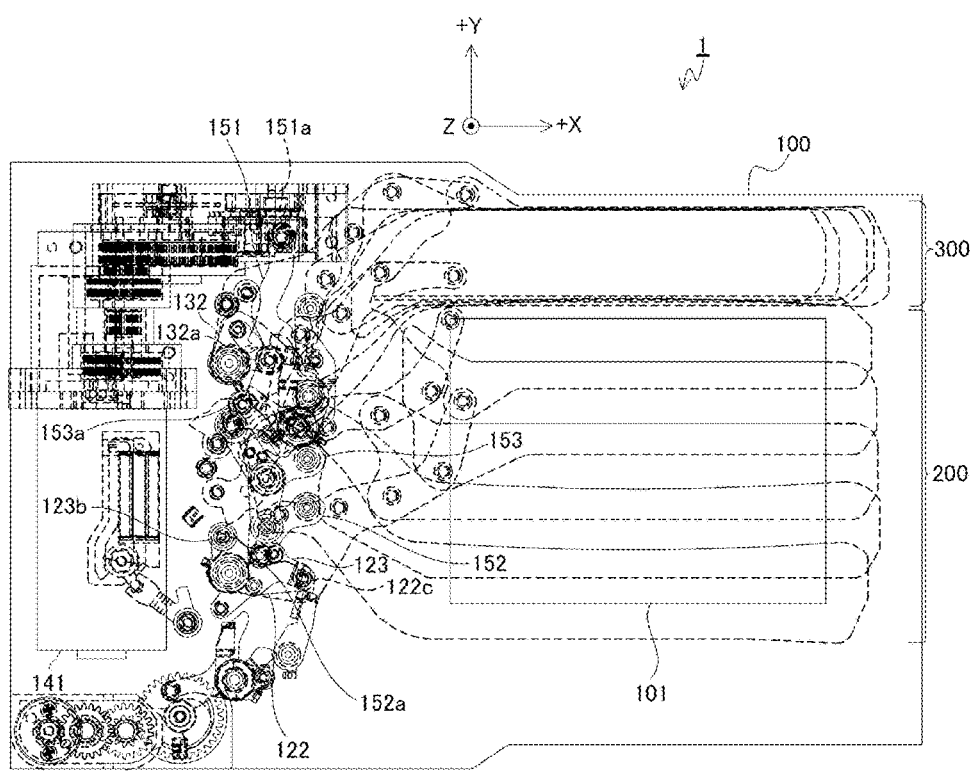
FIG. 15A is a front view showing the operation wherein the leading blade setting member and the trailing blade setting member retract in the normally closed mode in the focal plane shutter according to the example according to the present invention.
Figure 15B:
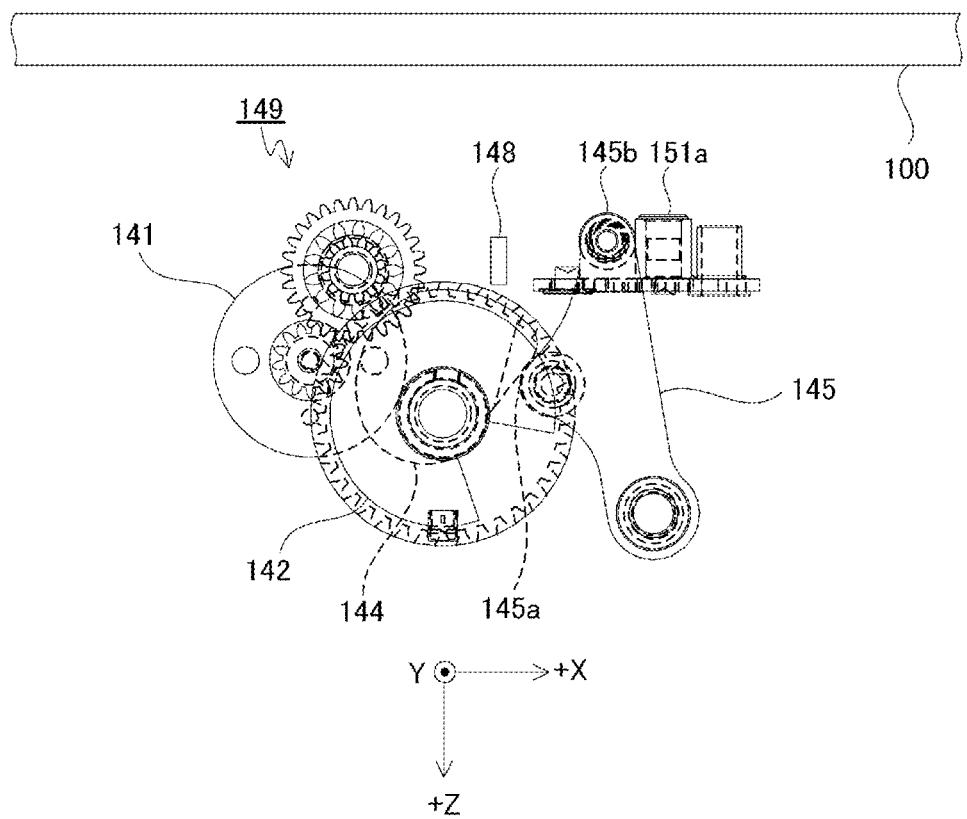
FIG. 15B is a schematic diagram wherein a setting driving portion in the focal plane shutter depicted in FIG. 15A is viewed from the +Y axial direction.

Following this, in the same manner as for the normally open mode, the leading blade setting member 152 and the trailing blade setting member 153 retract. That is, as depicted in FIG. 15B, the charging cam 144 of the charging portion is rotated in the counterclockwise direction by the charging motor 141 of the charging portion. Through this, as depicted in FIG. 15A, the setting lever 151 of the charging portion rotates in the counterclockwise direction. Accompanying the rotation of the setting lever 151 in the counterclockwise direction, the leading blade setting member 152 rotates in the counterclockwise direction to retract from the path of rotation of the second leading blade driving member 123. The trailing blade setting member 153 also retracts from the path of rotation of the second trailing blade driving member 132.

(Movement of the Braking Member)

Moreover, in the same manner as for the normally open mode, the braking member 161 is moved by the brake driving portion 165 to the position for braking the leading blades 200. Through this, the focal plane shutter 1 is placed in the same state for prior to the exposing operation as in the normally open mode, depicted in FIG. 6.

(Exposing Operation)

Following this, in the same manner as in the normally open mode, the focal plane shutter 1 carries out the exposing operation. In the exposing operation, the driving pin 122c of the first leading blade driving member 122, in the same manner as with the normally open mode, makes sliding contact with the sliding portion 161a of the braking member 161, pushing the braking member 161. Consequently, the braking member 161, in the same manner as with the normally open mode, is able to brake the leading blades 200. An image of the photographic subject is captured by the imaging element 6 of the imaging device 10 while the focal plane shutter 1 is carrying out the exposing operation.

(Charging Operation)

After the exposing operation has been completed, the focal plane shutter 1 carries out a charging operation. Note that in the normally closed mode, the first leading blade driving member 122 is not engaged.

Figure 16A:
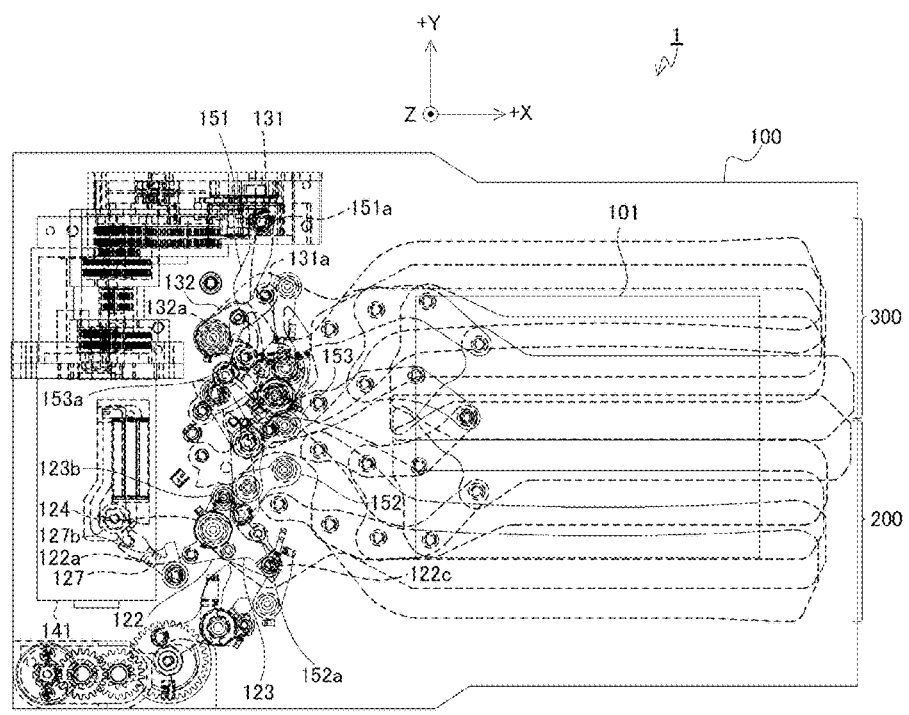
FIG. 16A is a front view showing the charging operation in the normally closed mode in the focal plane shutter according to the example according to the present invention.
Figure 16B:
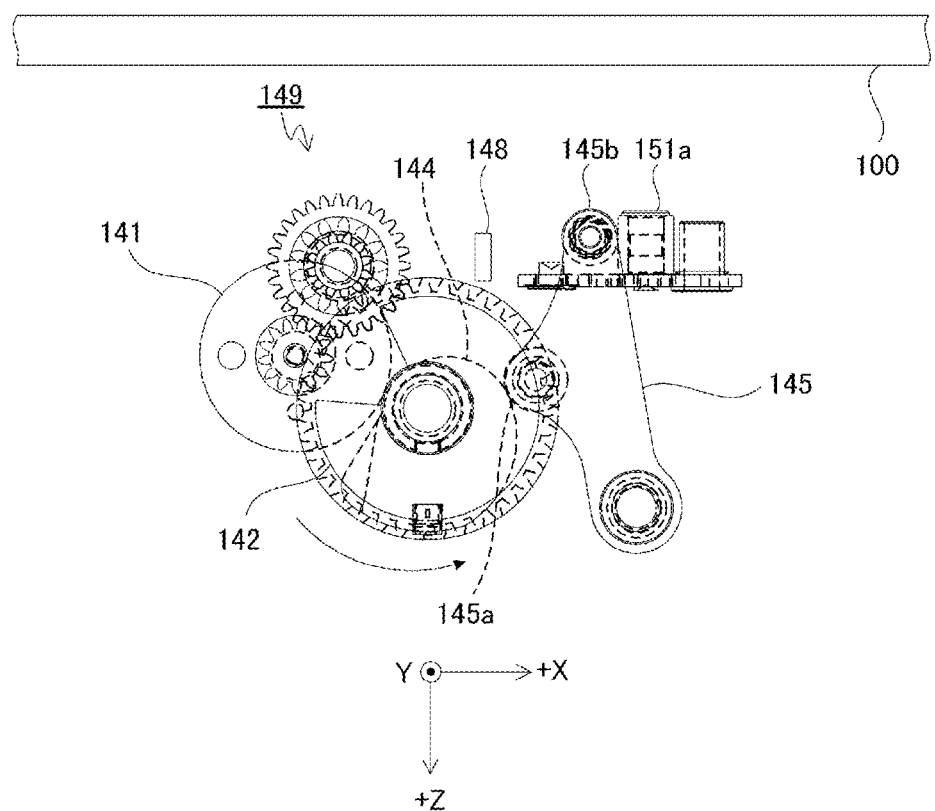
FIG. 16B is a schematic diagram wherein a setting driving portion in the focal plane shutter depicted in FIG. 16A is viewed from the +Y axial direction.

As depicted in FIG. 16B, in the same manner as for the normally open mode, the charging cam 144 is rotated in the counterclockwise direction. In the normally closed mode as well, the charging motor 141 is driven through the first driving voltage for applying the biasing force to the leading blade driving spring 124 and the trailing blade driving spring. As depicted in FIG. 16A, the setting lever 151 is rotated in the clockwise direction by the rotation of the charging cam 144. In accordance with the rotation of the setting lever 151 in the clockwise direction, the leading blade setting member 152 rotates in the clockwise direction, to push the second leading blade driving member 123. The second leading blade driving member 123 that is pushed by the leading blade setting member 152 rotates in the counterclockwise direction against the biasing force of the leading blade driving spring 124. Through this, the biasing force for driving the leading blades 200 is applied to the leading blade driving spring 124. Here, in the normally closed mode, the first leading blade driving member 122 is not engaged, and thus, in accordance with the rotation of the second leading blade driving member 123 in the counterclockwise direction, the first leading blade driving member 122 is rotated in the counterclockwise direction by the biasing force of the leading blade setting spring. Consequently, the leading blades 200 close the opening 101. Moreover, the trailing blade setting member 153 pushes the second trailing blade driving member 132 in accordance with the rotation of the setting lever 151 in the clockwise direction. The second trailing blade driving member 132 rotates in the counterclockwise direction against the biasing force of the trailing blade driving spring. Through this, the biasing force for driving the trailing blades 300 is applied to the trailing blade driving spring. Accompanying the rotation of the second trailing blade driving member 132 in the counterclockwise direction, the first trailing blade driving member 131 rotates in the counterclockwise direction against the biasing force of the trailing blade setting spring. Through this, the trailing blades 300 are stacked together.

When the charging operation has been completed, the focal plane shutter 1 will be in the standby state depicted in FIG. 14A and FIG. 14B. The focal plane shutter 1 stands by in the standby state until the next imaging operation.

As described above, in that the normally closed mode as well, because the brake driving portion 165 is independent of the leading blade driving portion, the trailing blade driving portion, and the charging portion, when the leading blades 200 are opening the opening 101 in the focal plane shutter 1, the braking member 161 for braking the leading blades 200 can be moved to the position for braking the leading blades 200 after the leading blades 200 have closed the opening 101. The braking member 161, through having a large frictional force with the friction member, is able to brake the leading blades 200 with a large braking force.

The operation of the focal plane shutter 1 in the electronic mode will be explained next in reference to FIG. 1A through FIG. 2 and FIG. 17 through FIG. 18B. Note that in FIG. 17 through FIG. 18B, for ease in understanding, reference symbols are shown for only those members relevant to the respective operations.

(Standby State)

When the electronic mode is selected, the focal plane shutter 1 stands by in the initial state until the start of imaging in the imaging device 10, in the same manner as with the normally open mode.

(Start of Imaging)

The imaging in the imaging device 10 is started through pressing of the release button 5 of the imaging device 10.

(Engagement of the Second Leading Blade Driving Member and the Second Trailing Blade Driving Member)

When the release button 5 of the imaging device 10 is pressed, then, in the same manner as with the normally open mode, the supply of power is started to the electromagnet 8a for the leading blades and to the electromagnet 8b for the trailing blades. Through this, the second leading blade driving member 123 and the second trailing blade driving member 132 become engaged, constraining the rotation of the second leading blade driving member 123 and of the second trailing blade driving member 132 in the clockwise direction.

(Retraction of the Leading Blade Setting Member and the Trailing Blade Setting Member)

Following this, in the same manner as with the normally open mode, the leading blade setting member 152 retracts from the path rotation of the second leading blade driving member 123 in accordance with the rotation of the charging cam 144 of the charging portion. Moreover, the trailing blade setting member 153 also retracts from the path of rotation of the second trailing blade driving member 132. In the electronic mode, even after the retraction of the leading blade setting member 152 and of the trailing blade setting member 153 has been completed, the first leading blade driving member 122 is engaged with the first constraining member 127. Moreover, the braking member 161 is not moved from the position for braking the leading blades 200.

(Exposing Operation)

Figure 17:
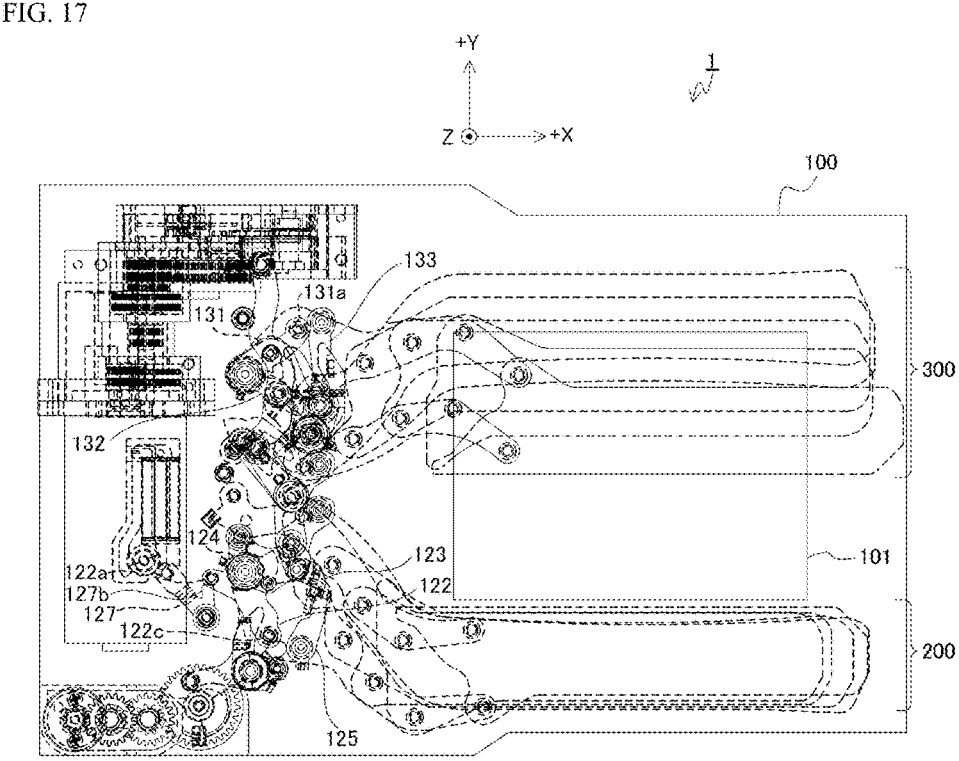
FIG. 17 is a front view showing the exposing operation in the electronic mode in the focal plane shutter according to the example according to the present invention.

The exposing operation is started next. The imaging element 6 of the imaging device 10 is controlled by the controlling portion 7 to start the imaging operation. After a prescribed time has elapsed from the start of imaging by the imaging element 6, the power to the electromagnet 8b for the trailing blades is stopped, to release the engagement of the second trailing blade driving member 132. When the engagement of the second trailing blade driving member 132 is released, then, as depicted in FIG. 17, the second trailing blade driving member 132 is rotated in the clockwise direction by the biasing force of the trailing blade driving spring. Through this, the driving pin 131a of the first trailing blade driving member 131 moves in the same manner as with the normally open mode, and the trailing blades 300 close the opening 101.

The exposing operation is completed through the above. The imaging element 6 starts the imaging, and an image of the photographic subject is captured while the trailing blades 300 close the opening 101. Note that the power to the electromagnet 8a for the leading blades is not stopped, and thus the second leading blade driving member 123 is engaged by the first engaging member 125. That is, the biasing force that is applied to the leading blade driving spring 124 is maintained.

(Charging Operation)

Figure 18A:
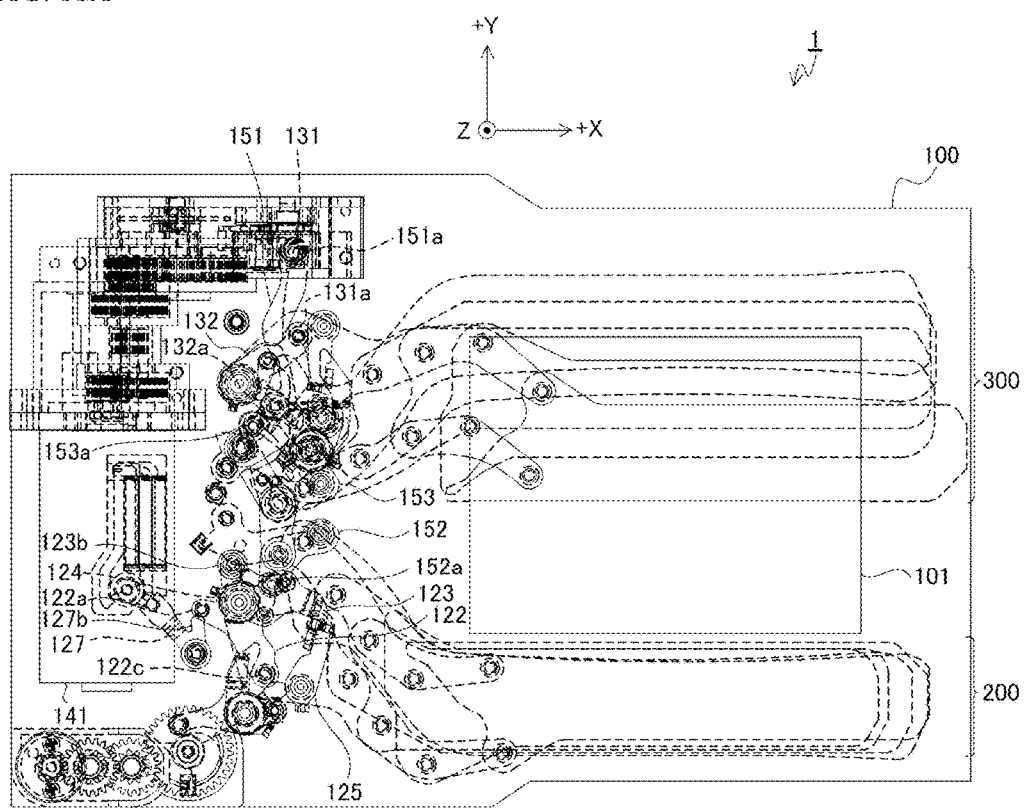
FIG. 18A is a front view showing the charging operation in the electronic mode in the focal plane shutter according to the example according to the present invention.
Figure 18B:
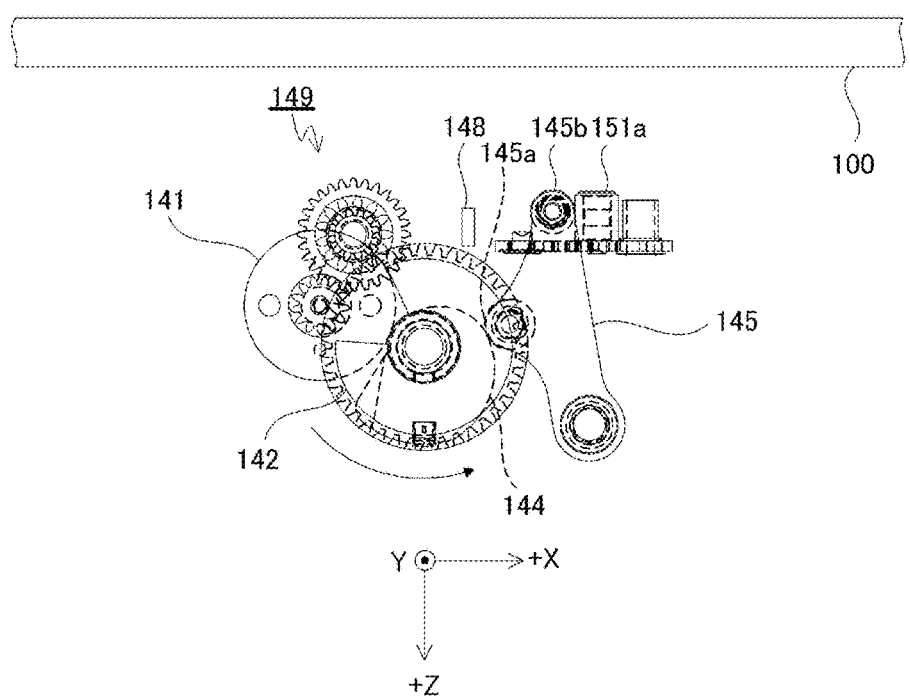
FIG. 18B is a schematic diagram wherein a setting driving portion in the focal plane shutter depicted in FIG. 18A is viewed from the +Y axial direction.

After the exposing operation has been completed, the focal plane shutter 1 carries out a charging operation. As depicted in FIG. 18B, the charging cam 144 is rotated in the counterclockwise direction by the charging motor 141. In the electronic mode, the charging motor 141 is driven by a second driving voltage for applying the biasing force to the trailing blade driving spring. The second driving voltage is less than the first driving voltage for driving the charging motor 141 in the normally open mode and in the normally closed mode. As depicted in FIG. 18A, the setting lever 151 is rotated in the clockwise direction by the rotation of the charging cam 144. The leading blade setting member 152 and the trailing blade setting member 153 rotate in the clockwise direction, in accordance with the rotation of the setting lever 151 in the clockwise direction. The second trailing blade driving member 132, pushed by the trailing blade setting member 153, rotates in the counterclockwise direction against the biasing force of the trailing blade driving spring. Through this, the second trailing blade driving member 132 that is pushed by the trailing blade setting member 153 rotates in the counterclockwise direction against the biasing force of the trailing blade driving spring. Through this, the biasing force for driving the trailing blades 300 is applied to the trailing blade driving spring. Accompanying the rotation of the second trailing blade driving member 132 in the counterclockwise direction, the first trailing blade driving member 131 rotates in the counterclockwise direction against the biasing force of the trailing blade setting spring. Through this, the trailing blades 300 open the opening 101. On the other hand, in the state wherein the biasing force is applied to the leading blade driving spring 124, the second leading blade driving member 123 is engaged by the first engaging member 125, and thus the leading blade setting member 152 that rotates in the clockwise direction does not push the second leading blade driving member 123.

When the clockwise rotation of the leading blade setting member 152 and the trailing blade setting member 153 has been completed, the power to the electromagnet 8a for the leading blades is then stopped, and the engagement of the second leading blade driving member 123 is released. Through this, the focal plane shutter 1 returns to the initial state (the standby state) depicted in FIG. 1A and FIG. 1B. The focal plane shutter 1 standby, in the initial state (the standby state) until the next imaging. Note that, instead, the focal plane shutter 1 may standby until the next imaging operation in a state wherein power is continuously applied to the electromagnet 8a for the leading blades. In this case, when the release button 5 of the imaging device 10 is pressed for the next imaging operation, the application of power to the electromagnet 8b for the trailing blades is started.

As described above, the focal plane shutter 1 can operate in an electronic mode, in addition to the normally closed mode and the normally open mode. Moreover, in the focal plane shutter 1, the leading blades 200 can be subjected to braking with a large braking force. In the electronic mode as well, the charging motor 141 is driven by a second driving voltage that is smaller than the first driving voltage, for applying a biasing force to the trailing blade driving spring. Because the biasing force for the leading blade driving spring 124 is maintained, the focal plane shutter 1 can achieve a charging operation in the electronic mode by driving the charging motor 141 with a second driving voltage, which is smaller than the first driving voltage, to apply the biasing force to the trailing blade driving spring. Through this, the excessive rotation of the trailing blade setting member 153 and the second trailing blade driving member 132 in the electronic mode is prevented, enabling achievement of stabilized operation of the focal plane shutter 1. Moreover, because the charging motor 141 is driven by the second driving voltage that is smaller than the first driving voltage, this can prevent the noise of operation in the charging operation.

(Switching of Operating Modes)

The operating mode is switched by a selection by the user when the focal plane shutter 1 is in a state standing-by for imaging in the imaging device 10. When switching to the normally closed mode from the normally open mode or the electronic mode, the focal plane shutter 1 goes to the standby state for the normally closed mode through releasing of the engagement of the first leading blade driving member 122 from the initial state for standing by for imaging. Through this, the focal plane shutter 1 can operate in that the normally closed mode. Moreover, when switching from the normally closed mode to the normally open mode or the electronic mode, the focal plane shutter 1 carries out the operation from the standby state in the normally closed mode up to the exposing operation, followed by the charging operation of the normally open mode. Through this, the focal plane shutter 1 goes to the initial state, enabling operation in the normally open mode or the electronic mode.

As described above, the focal plane shutter 1 enables operation in the normally open mode, the normally closed mode, and the electronic mode, and enables braking of the leading blades 200 with a large braking force.

(Other Example)

Figure 19:
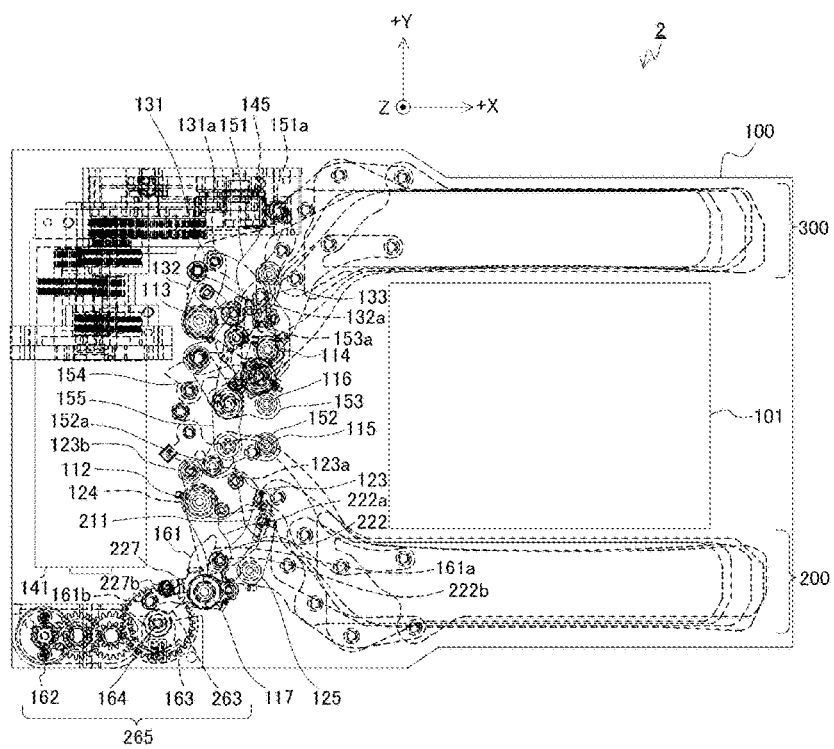
FIG. 19 is a front view depicting an initial state of a focal plane shutter according to another example according to the present invention.

A focal plane shutter 2 according to the present example will be explained in reference to FIG. 19 through FIG. 26. Note that in FIG. 23 through FIG. 26, for ease in understanding, reference symbols are shown for only those members relevant to the respective operations. As with the focal plane shutter 1, the focal plane shutter 2 is provided in, for example, an imaging device 10, an electronic device, or the like. The focal plane shutter 2, as depicted in FIG. 19, is provided with a first leading blade driving member 222, a second constraining member 227, and a brake driving portion 265 instead of the first leading blade driving member 122, the first constraining member 127 and the brake driving portion 165 of the focal plane shutter 1. The focal plane shutter 2 is not equipped with the switching actuator 128 of the focal plane shutter 1. In the focal plane shutter 1, the first constraining member 127 for engaging the first leading blade driving member 122 was moved by the switching actuator 128, but in the focal plane shutter 2, the second constraining member 227 for engaging the first leading blade driving member 222 is moved by the brake driving portion 265 to the position for releasing the engagement of the first leading blade driving member 222. The brake driving portion 265 moves the braking member 161 and the second constraining member 227. The other structures are identical to those of the focal plane shutter 1.

(First Leading Blade Driving Member)

Figure 20:
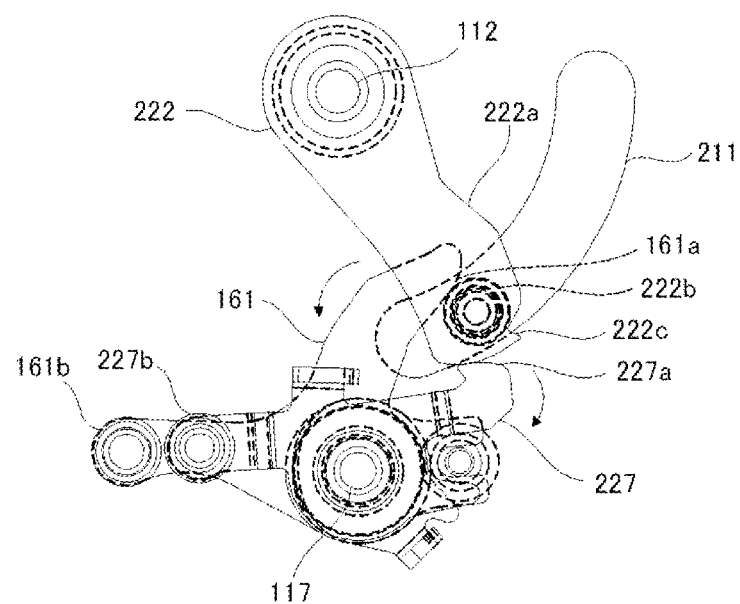
FIG. 20 is a schematic diagram illustrating the operation for braking the leading blades in the focal plane shutter according to the other example according to the present invention.

The first leading blade driving member 222, in the same manner as for the first leading blade driving member 122 of the focal plane shutter 1, drives the leading blades 200 from the state wherein the leading blades 200 have opened the opening 101 to the closed state, through the biasing force of the leading blade setting spring. One end portion of the first leading blade driving member 222 is supported rotatably on the shaft 112. The first leading blade driving member 222 is biased in the counterclockwise direction by the leading blade setting spring. The first leading blade driving member 222, as depicted in FIG. 19 and FIG. 20, has a pushed portion 222a, a driving pin 222b, and a cutaway portion 222c.

When the second leading blade driving member 123 is rotated by the biasing force of the leading blade driving spring 124, the pushed portion 222a of the first leading blade driving member 222 is pushed by the pushing portion 123a of the second leading blade driving member 123. The first leading blade driving member 222 is rotated in the clockwise direction together with the second leading blade driving member 123 through the pushed portion 222a being pushed by the pushing portion 123a of the second leading blade driving member 123.

The driving pin 222b of the first leading blade driving member 222 is provided on the -Z side surface of the other end portion of the first leading blade driving member 222. The driving pin 222b is inserted into an elongated hole 211 that is formed in the base plate 100. The driving pin 222b is connected to the leading blades 200 in a blade chamber for enclosing the leading blades 200. Consequently, the leading blades 200 are deployed or stacked together in accordance with the rotation of the first leading blade driving member 222. In the present example as well, in the same manner as in the above example, when the first leading blade driving member 222 has rotated in the clockwise direction so that the driving pin 222b moves from the top end to the bottom end of the elongated hole 211, the leading blades 200 stack together, to open the opening 101. When the first leading blade driving member 222 has rotated in the counterclockwise direction so that the driving pin 222b moves from the bottom end to the top end of the elongated hole 211, the leading blades 200 deploy, to close the opening 101.

Figure 21:
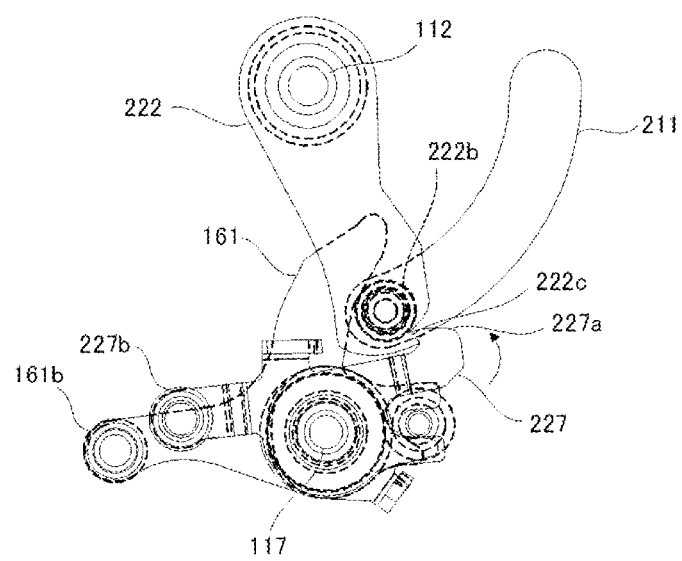
FIG. 21 is a schematic diagram illustrating the operation for engaging the first leading blade driving member in the focal plane shutter according to the other example according to the present invention.

The cutaway portion 222c of the first leading blade driving member 222 is formed through cutting away a side face of the end portion wherein the driving pin 222b is provided. The cutaway portion 222c engages with a protruding portion 227a of the second constraining member 227, as depicted in FIG. 21, when in the state wherein the leading blades 200 open the opening 101. The rotation of the first leading blade driving member 222 in the counterclockwise direction by the biasing force of the leading blade setting spring is constrained by the engagement of the cutaway portion 222c and the protruding portion 227a of the second constraining member 227.

(Second Constraining Member)

The second constraining member 227 engages the first leading blade driving member 222 to constrain the rotation of the first leading blade driving member 222 in the counterclockwise direction. The operation of the focal plane shutter 2 is switched between the normally closed mode and the normally open mode or the electronic mode through whether or not the rotation of the first leading blade driving member 222 in the counterclockwise direction is constrained. The second constraining member 227, as depicted in FIG. 19 through FIG. 21, is supported rotatably on the shaft 117. The second constraining member 227 is biased in the counterclockwise direction by the biasing force of a biasing spring (not shown). The second constraining member 227 has a protruding portion 227a on one end portion thereof, and has a pushed portion 227b on the other end portion thereof.

The protruding portion 227a engages with the cutaway portion 222c of the first leading blade driving member 222. Through this, the second constraining member 227 engages the first leading blade driving member 222, to constrain the rotation of the first leading blade driving member 222 in the counterclockwise direction.

In the present example, the protruding portion 227a is positioned in the path of rotation of the end portion of the driving pin 222b in the first leading blade driving member 222 when the driving pin 222b of the first leading blade driving member 222 moves to the bottom end of the elongated hole 211 and the leading blades 200 open the opening 101. Consequently, when the driving pin 222b moves to the bottom end of the elongated hole 211, the protruding portion 227a, as depicted in FIG. 20, is pushed back to the end portion that has the driving pin 222b in the first leading blade driving member 222. The second constraining member 227, wherein the protruding portion 227a has been pushed back, rotates in the clockwise direction against the biasing force of the biasing spring. When the driving pin 222b has reached the bottom end of the elongated hole 211, then, as depicted in FIG. 21, the second constraining member 227 is rotated in the counterclockwise direction by the biasing force of the biasing spring, and the protruding portion 227a engages with the cutaway portion 222c of the first leading blade driving member 222. The rotation of the first leading blade driving member 222 in the counterclockwise direction is constrained thereby, to maintain the state wherein the leading blades 200 have opened the opening 101. Moreover, after having been pushed back by the first leading blade driving member 222, the protruding portion 227a engages with the cutaway portion 222c of the first leading blade driving member 222, and thus the focal plane shutter 2 prevents the rebounding of the leading blades 200 that would be produced through the driving pin 222b contacting the bottom end of the elongated hole 211.

Figure 22:
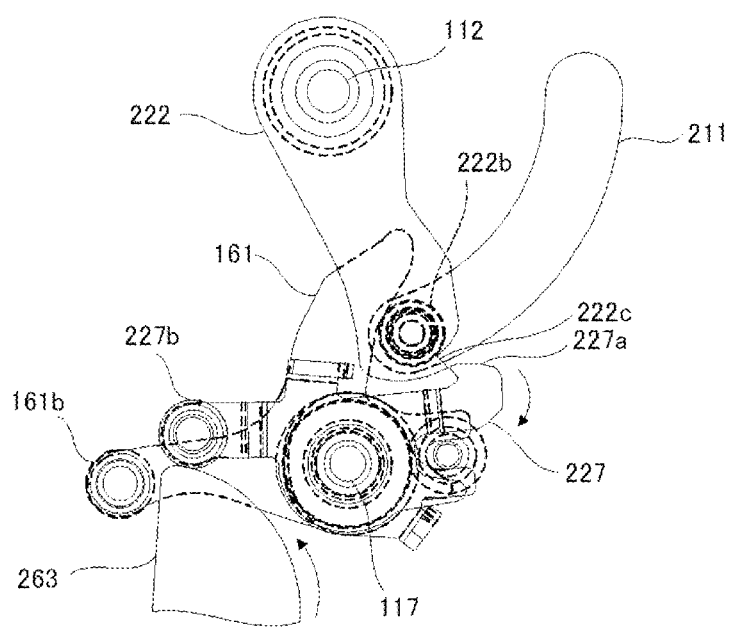
FIG. 22 is a schematic diagram illustrating the operation for releasing the engagement of the first leading blade driving member in the focal plane shutter according to the other example according to the present invention.

The pushed portion 227b is pushed by the second cam member 263 of the brake driving portion 265, as depicted in FIG. 22. The second constraining member 227 wherein the pushed portion 227b has been pushed is rotated in the clockwise direction by the biasing force of the biasing spring. The engagement between the protruding portion 227a and the cutaway portion 222c of the first leading blade driving member 222 is released thereby, and the leading blades 200 close the opening 101.

(Brake Driving Portion)

portion 265 moves, to the position for braking the leading blades 200, the braking member 161 that is out of the path of rotation of the driving pin 222b of the first leading blade driving member 222, independently of the leading blade driving portion, the trailing blade driving portion, and the charging portion. Moreover, the brake driving portion 265 moves the second constraining member 227 to the position for releasing the engagement of the first leading blade driving member 222. As with the brake driving portion 165 of the focal plane shutter 1, the brake driving portion 265 has a motor 162 and a first cam member 163. The brake driving portion 265 also has a second cam member 263.

As with the motor 162 of the brake driving portion 165, the motor 162 of the brake driving portion 265 rotates the first cam member 163. Moreover, the motor 162 of the brake driving portion 265 rotates also the second cam member 263, through a gear (not shown).

The first cam member 163 of the brake driving portion 265, in the same manner as with the first cam member 163 of the brake driving portion 165, rotates centered on the shaft 164, to push the pushed portion 161b of the braking member 161. The braking member 161 that is pushed by the first cam member 163 rotates in the clockwise direction, to move to the position for braking the leading blades 200. Consequently, as with the brake driving portion 165 of the focal plane shutter 1, the brake driving portion 265 is able to move the braking member 161 to the position for braking the leading blades 200, independently of the operations of the leading blade driving portion, the trailing blade driving portion, and the charging portion.

As with the first cam member 163, the second cam member 263 of the brake driving portion 265 rotates centered on the shaft 164. The second cam member 263 rotates, to push the pushed portion 227b of the second constraining member 227. The second constraining member 227, which has pushed the pushed portion 227b, rotates in the clockwise direction, as depicted in FIG. 22. The engagement between the protruding portion 227a of the second constraining member 227 and the cutaway portion 222c of the first leading blade driving member 222 is released by rotation of the second constraining member 227 in the clockwise direction. Through this, the engagement of the first leading blade driving member 222 by the second constraining member 227 is released, and the leading blades 200 close the opening 101. Moreover, after the engagement of the first leading blade driving member 222 by the second constraining member 227 has been released, the second cam member 263 rotates further, to move away from the second constraining member 227. Through this, the second constraining member 227 is rotated in the counterclockwise direction by the biasing force of the biasing spring. The protruding portion 227a of the second constraining member 227 returns to the path of rotation of the end portion wherein there is the driving pin 222b in the first leading blade driving member 222.

(Operation of the Focal Plane Shutter)

The operation of the focal plane shutter 2, provided in the imaging device 10, will be explained next. As with the focal plane shutter 1, the focal plane shutter 2 operates in a normally open mode, a normally closed mode, and an electronic mode. The focal plane shutter 2 operates in the mode selected by the user.

The operation of the focal plane shutter 2 in the normally open mode will be explained.

(Initial State)

When the imaging device 10 is started up, the focal plane shutter 2 will be in the initial state. Note that the initial state is the same for all three modes. As depicted in FIG. 19, in the initial state of the focal plane shutter 2, the first leading blade driving member 222 is engaged by the second constraining member 227. The other members are identical to those of the focal plane shutter 1.

(Standby State)

When the normally open mode is selected, the focal plane shutter 2 stands by in the initial state until the start of imaging in the imaging device 10.

(Start of Imaging)

The imaging in the imaging device 10 is started through pressing of the release button 5 of the imaging device 10.

(Engagement of the Second Leading Blade Driving Member and the Second Trailing Blade Driving Member)

As with the focal plane shutter 1, when the release button 5 of the imaging device 10 is pressed, power is applied to the electromagnet 8a for the leading blades and the electromagnet 8b for the trailing blades, so that the first engaging member 125 of the leading blade driving portion and the second engaging member 133 of the trailing blade driving portion engage, respectively, with the second leading blade driving member 123 and the second trailing blade driving member 132.

(Release of the First Leading Blade Driving Member)

Figure 23:
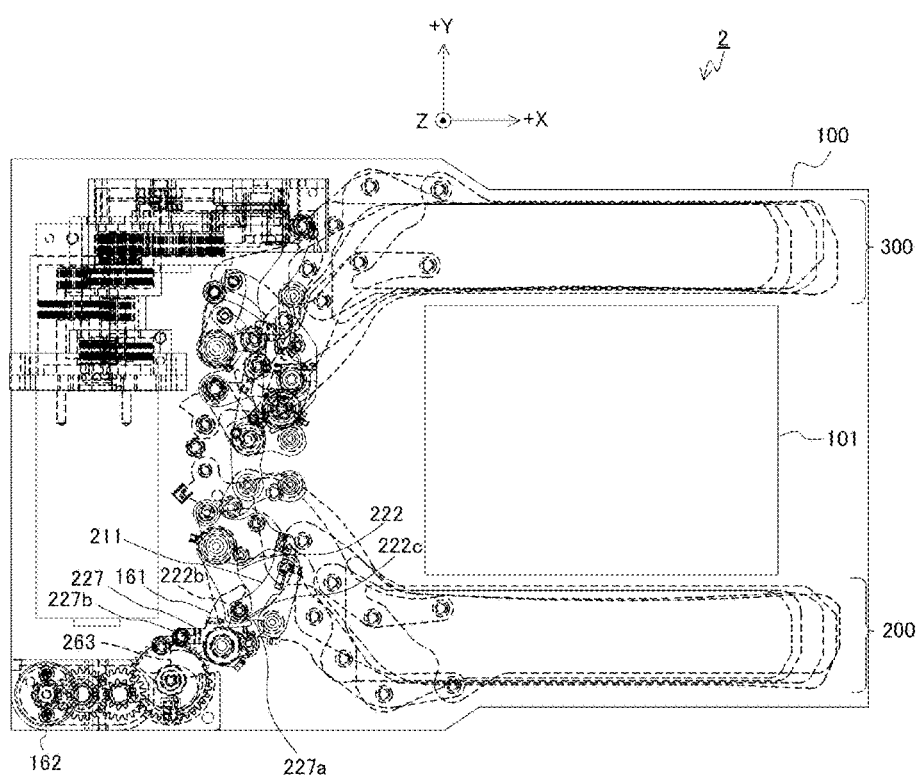
FIG. 23 is a front view illustrating the operation for releasing the engagement of the first leading blade driving member in the normally open mode in the focal plane shutter according to the other example according to the present invention.

Moreover, the second cam member 263 of the brake driving portion 265 is rotated by the motor 162 of the brake driving portion 265, to push the second constraining member 227. The second constraining member 227, pushed by the second cam member 263, rotates in the clockwise direction, as depicted in FIG. 22 and FIG. 23, to release the engagement of the first leading blade driving member 222. Through this, in the same manner as for the focal plane shutter 1, the leading blades 200 close the opening 101. On the other hand, the second cam member 263 rotates further, to move away from the second constraining member 227. Through this, the second constraining member 227 rotates in the counterclockwise direction, and the protruding portion 227a of the second constraining member 227 returns into the path of rotation of the end portion wherein there is the driving pin 222b in the first leading blade driving member 222.

(Retraction of the Leading Blade Setting Member and the Trailing Blade Setting Member)

Following this, in the same manner as with the focal plane shutter 1, the charging cam 144 of the charging portion is rotated in the counterclockwise direction by the charging motor 141 of the charging portion, and the leading blade setting member 152 is retracted from the path of rotation of the second leading blade driving member 123. The trailing blade setting member 153 also retracts from the path of rotation of the second trailing blade driving member 132.

(Movement of the Braking Member)

Figure 24:
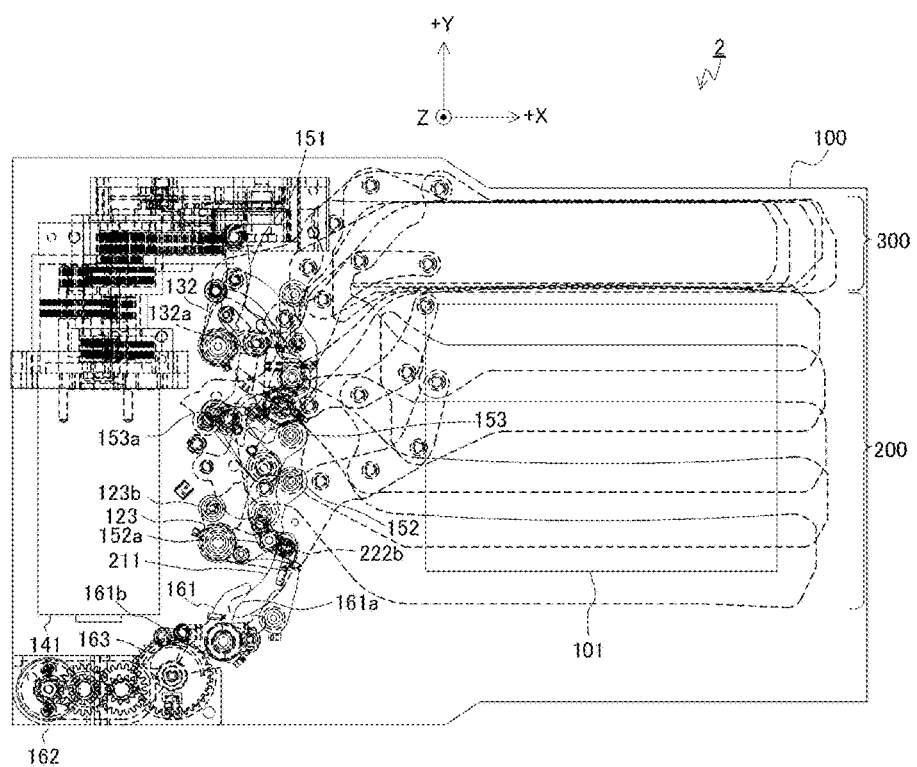
FIG. 24 is a front view depicting the operation wherein the braking member moves in that the normally open mode of the focal plane shutter according to the other example according to the present invention.

Moreover, in the same manner as with the focal plane shutter 1, the first cam member 163 of the brake driving portion 265 is rotated by the motor 162 of the brake driving portion 265, and the braking member 161, as depicted in FIG. 24, is moved to the position for braking the leading blades 200. After moving the braking member 161 to the position for braking the leading blades 200, the first cam member 163 moves away from the braking member 161.

(Exposing Operation)

The exposing operation is started next.

(Exposing Operation of the Leading Blades)

Figure 25:
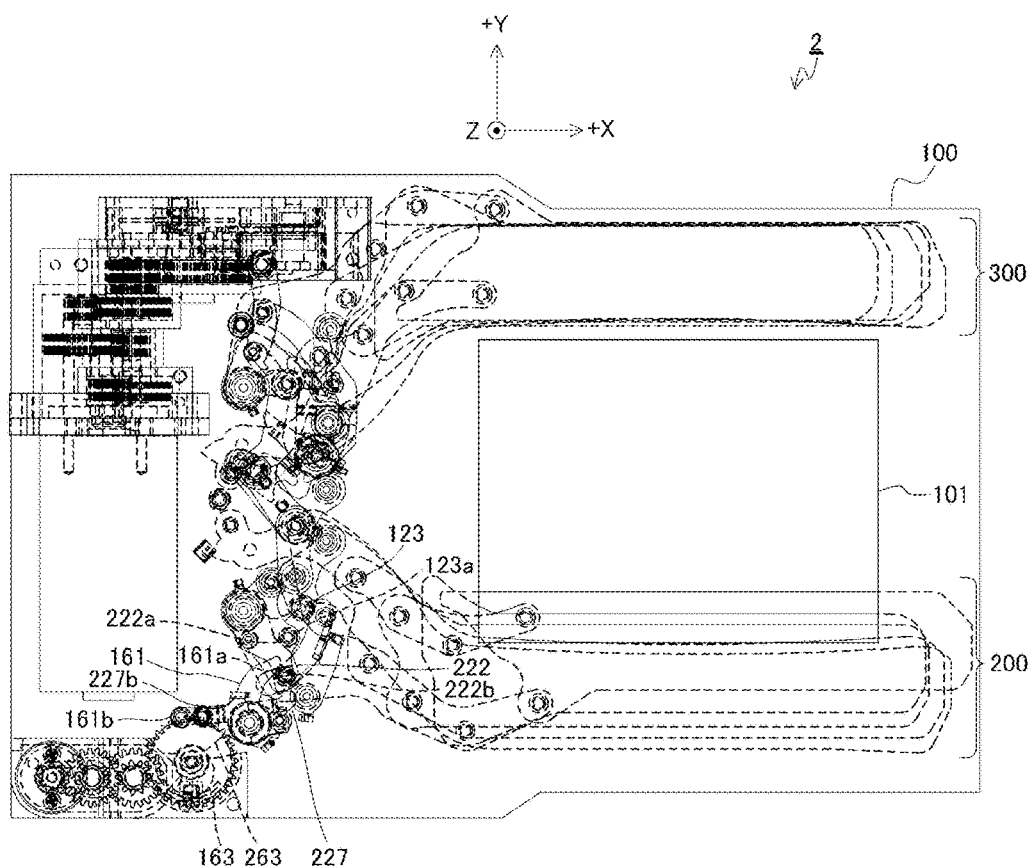
FIG. 25 is a front view showing the operation for braking the leading blade in the normally open mode in the focal plane shutter according to the other example according to the present invention.

The engagement of the second leading blade driving member 123 of the first engaging member 125 is released through stopping the power to the electromagnet 8*a* for the leading blades, in the same manner as with the focal plane shutter 1. Through this, in the same manner as with the focal plane shutter 1, the driving pin 222*b* of the first leading blade driving member 222 moves from the top end to the bottom end of the elongated hole 211, and the leading blades 200 open the opening 101. As depicted in FIG. 20 and FIG. 25, the driving pin 222*b* that moves to the bottom end of the elongated hole 211 makes sliding contact with the sliding portion 161*a* of the braking member 161 immediately prior to the end of movement. Through this, in the same manner as with the focal plane shutter 1, the braking member 161 brakes the leading blades 200. The braking member 161, after braking the leading blades 200, moves out of the path of rotation of the driving pin 222*b*.

Figure 26:
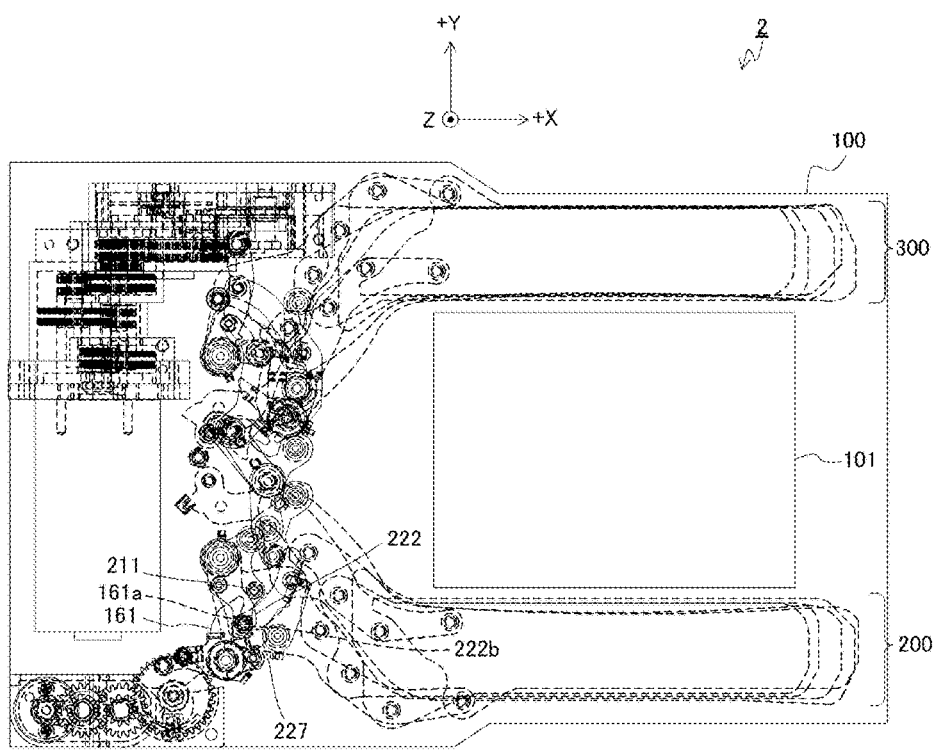
FIG. 26 is a front view illustrating the operation for engaging the first leading blade driving member in the normally open mode in the focal plane shutter according to the other example according to the present invention.

On the other hand, the protruding portion 227*a* of the second constraining member 227 returns to the path of rotation of the end portion that has the driving pin 222*b* in the first leading blade driving member 222, and thus, as depicted in FIG. 20, the protruding portion 227*a* is pushed back by the end portion that has the driving pin 222*b* in the first leading blade driving member 222. When the driving pin 222*b* has reached the bottom end of the elongated hole 211, the second constraining member 227, as depicted in FIG. 26, is rotated in the counterclockwise direction by the biasing force of the biasing spring, and the protruding portion 227*a*, as depicted in FIG. 21, engages with the cutaway portion 222*c* of the first leading blade driving member 222. The rotation of the first leading blade driving member 222 in the counterclockwise direction is constrained thereby.

The speed of movement of the leading blades 200 is reduced by the braking by the braking member 161, thus preventing rebounding of the leading blades 200. Moreover, because the protruding portion 227*a* engages with the cutaway portion 222*c*, this further suppresses rebounding of the leading blades 200.

(Exposing Operation of the Trailing Blades)

As with the focal plane shutter 1, after a prescribed time has elapsed after power to the electromagnet 8*a* for the leading blades has been stopped, power to the electromagnet 8*b* for the trailing blades is stopped as well, and the engagement of the second trailing blade driving member 132 by the second engaging member 133 is released. Through this, the trailing blades 300 close the opening 101, in the same manner as with the focal plane shutter 1.

The exposing operation is completed through the above. An image of the photographic subject is captured by the imaging element 6 of the imaging device 10 while the focal plane shutter 2 is carrying out the exposing operation.

(Charging Operation)

After the exposing operation, the focal plane shutter 2 carries out a charging operation, in the same manner as with the focal plane shutter 1. The charging operation in the focal plane shutter 2 is the same as the charging operation in the focal plane shutter 1.

Once the charging operation has been completed, the focal plane shutter 2 returns to the initial state (the standby state), depicted in FIG. 19. The focal plane shutter 2 stands by, in the initial state (the standby state) until the next imaging operation.

As described above, in the focal plane shutter 2, the brake driving portion 265, as with the brake driving portion 165 of the focal plane shutter 1, is independent of the leading blade driving portion, the trailing blade driving portion, and the charging portion. Consequently, when the leading blades 200 are opening the opening 101 in the focal plane shutter 2, the braking member 161 for braking the leading blades can be moved to the position for braking the leading blades 200 after the leading blades 200 have closed the opening 101. Moreover, the braking member 161, through having a large frictional force with the friction member, is able to brake the leading blades 200 with a large braking force. Furthermore, the protruding portion 227*a* of the second constraining member 227 engages with the cutaway portion 222*c* of the first leading blade driving member 222 when the driving pin 222*b* reaches the bottom end of the elongated hole 211, thus enabling the focal plane shutter 2 to further suppress rebounding of the leading blades 200.

The operation of the focal plane shutter 2 in the normally closed mode will be explained next.

(Standby State)

When the normally closed mode is selected, the focal plane shutter 2, in the same manner as with the focal plane shutter 1, releases the engagement of the first leading blade driving member 222 from the initial state, to enter the standby state. In the standby state, the leading blades 200 close the opening 101. The focal plane shutter 2 stands by in the standby state until the beginning of imaging in the imaging device 10.

(Start of Imaging)

The imaging in the imaging device 10 is started through pressing of the release button 5 of the imaging device 10. Even in the normally closed mode, in the same manner as with the normally open mode, in the focal plane shutter 2, the second leading blade driving member 123 and the second trailing blade driving member 132 are engaged, the leading blade setting member 152 and the trailing blade setting member 153 retract, and the braking member 161 moves, to operate following the sequence of the exposing operation. Moreover, in the normally closed mode, these operations are identical to the operations in the normally open mode.

(Charging Operation)

After the exposing operation has been completed, the focal plane shutter 2 carries out a charging operation. In the normally closed mode, the charging operation is carried out in a state wherein the engagement of the first leading blade driving member 222 has been released. That is, the second cam member 263 of the brake driving portion 265 is rotated by the motor 162 of the brake driving portion 265, to push the second constraining member 227. The second constraining member 227, pushed by the second cam member 263, rotates in the clockwise direction, as depicted in FIG. 22, to release the engagement of the first leading blade driving member 222. In the state wherein the engagement of the first leading blade driving member 222 has been released, the charging cam 144, in the same manner as with the focal plane shutter 1, is rotated in the counterclockwise direction by the charging motor 141. The setting lever 151 is rotated in the clockwise direction by the rotation of the charging cam 144, to apply a biasing force to the leading blade driving spring 124 and the trailing blade driving spring, in the same manner as with the focal plane shutter 1. Here the engagement of the first leading blade driving member 222 is released, so the first leading blade driving member 222 is rotated in the counterclockwise direction by the biasing force of the leading blade setting spring, so the leading blades 200 close the opening 101. Moreover, the first trailing blade driving member 131 is rotated in the counterclockwise direction by the biasing force of the trailing blade setting spring, so the trailing blades 300 are stacked together. After the first leading blade driving member 222 has rotated, the second cam member 263 is rotated further, to move away from the second constraining member 227. Through this, the protruding portion 227a of the second constraining member 227 returns to the path of rotation of the end portion wherein there is the driving pin 222b in the first leading blade driving member 222. When the charging operation has been completed, the focal plane shutter 2 goes into the standby state. The focal plane shutter 2 stands by in the standby state until the next imaging operation.

As described above, in the normally closed mode as well, the braking member 161 can be moved to the position for braking the leading blades 200 after the leading blades 200 have closed the opening 101. The braking member 161, through having a large frictional force with the friction member, is able to brake the leading blades 200 with a large braking force. Moreover, because the protruding portion 227a of the second constraining member 227 engages the cutaway portion 222c of the leading blade driving member 222, the focal plane shutter 2 can further suppress the rebounding of the leading blades 200.

The operation of the electronic mode in the focal plane shutter 2 is the same as the operation in the electronic mode in the focal plane shutter 1. Moreover, in the focal plane shutter 2, in the state that is standing by for imaging in the imaging device 10, the operating mode can be switched in the same manner as in the focal plane shutter 1.

As described above, the focal plane shutter 2 enables operation in the normally open mode, the normally closed mode, and the electronic mode, and enables braking of the leading blades 200 with a large braking force. Moreover, the focal plane shutter 2 is able to suppress further rebounding of the leading blades 200. Furthermore, because there is no switching actuator 128 and the brake driving portion 265 moves the second constraining member 227, this can reduce the number of components, enabling a reduction in costs. Note that in the normally open mode and the normally closed mode, the charging motor 141 is driven by the first driving voltage that applies the biasing force to the leading blade driving spring 124 and the trailing blade driving spring. Moreover, in the electronic mode the charging motor 141 is driven by the second driving voltage, which is less than the first driving voltage, for applying the biasing force to the trailing blade driving spring.

The present invention is not limited to the examples set forth above, but rather may be varied in a variety of ways. For example, the trailing blade driving portions in the focal plane shutters 1 and 2 may be structured from a single trailing blade driving member that is linked to the trailing blades 300 and biased in the clockwise direction by a trailing blade driving spring.

In the focal plane shutters 1 and 2, the friction member for applying friction to the braking member 161 may be provided on the base plate 100. For example, the braking member 161 may brake the leading blades 200 through friction with an elastic body, manufactured from resin, provided on the −Z the side surface of the base plate 100.

In the focal plane shutter 1, a motor, such as a DC motor or a servo motor, or the like, may be provided instead of the switching actuator 128. Moreover, in the focal plane shutters 1 and 2, electromagnetic actuators may be provided instead of the charging motor 141 and the motor 162. The charging motor 141 and the motor 162 are not limited to DC motors, but rather may be servo motors, or the like, instead. Note that in the present Specification, motors such as DC motors, servo motors, and like, are included in the concept of an actuator.

In the brake driving portion 265 of the focal plane shutter 2, the first cam member 163 and the second cam member 263 may be formed integrally. The focal plane shutter 2, the protruding portion 227a of the second constraining member 227 may engage the driving pin 222b of the first leading blade driving member 222. In this case, the first leading blade driving member 222 will not have a cutaway portion 222c. Moreover, the protruding portion 227a may engage the driving pin 222b after the driving pin 222b has arrived at the bottom end of the elongated hole 211, after first being pushed back by the driving pin 222b of the first leading blade driving member 122.

Although an example according to the present invention has been explained above, the present invention is not limited to this example, but rather may be varied in a variety of ways within a range that does not deviate from the spirit or intent of the present invention. The present application is based on Japanese Patent Application 2015-192730, and Japanese Patent Application 2015-193948, which were filed on Sep. 30, 2015. The present application incorporates by reference the Specifications and Patent Claims of Japanese Patent Application 2015-192730, and Japanese Patent Application 2015-193948.

The invention claimed is:

1. A focal plane shutter comprising:
 a base plate wherein an opening is formed;
 a leading blade and a trailing blade opening and closing the opening;
 a leading blade driving portion comprising:
  a first leading blade driving member that is coupled with the leading blade, that is moved through a first biasing force of a first biasing member, and that drives the leading blade in a direction of closing the opening; and
  a second leading blade driving member that moves in accordance with the first leading blade driving member through a second biasing force of a second biasing member in a direction that is opposite to that of the first driving force, to drive the leading blade in a direction of opening the opening;
 a trailing blade driving portion having a trailing blade driving member that is moved by a third biasing force of a third biasing member to drive the trailing blade in the direction of closing the opening;
 a charging portion applying the second biasing force to the second biasing member and applying the third biasing force to the third biasing member;
 a braking member braking the leading blade, through friction with a friction member that is provided on the base plate, when the leading blade opens the opening; and
 a brake driving portion moving the braking member to a position braking the leading blade, independently of the leading blade driving portion, the trailing blade driving portion, and the charging portion.

2. The focal plane shutter as set forth in claim 1, wherein:
the braking member is out of a path of movement of the first leading blade driving member when the leading blade closes the opening.

3. The focal plane shutter as set forth in claim 1, wherein:
the brake driving portion has a first actuator moving the braking member to a position for braking the leading blade.

4. The focal plane shutter as set forth in claim 3, wherein:
the brake driving portion has a cam member that is rotated by the first actuator, to push the braking member; and
the cam member moves away from the braking member when the braking member is braking the leading blade.

5. The focal plane shutter as set forth in claim 3, comprising:
a second constraining member that is moved by the first actuator, constraining movement of the first leading blade driving member.

6. The focal plane shutter as set forth in claim 5, wherein:
the first leading blade driving member has a cutaway portion on a side face; and
the second constraining member has a first protruding portion engaging the cutaway portion of the first leading blade driving member.

7. The focal plane shutter as set forth in claim 5, wherein:
the first leading blade driving member has a driving pin that is linked to the leading blade; and
the second constraining member has a second protruding portion engaging the driving pin.

8. The focal plane shutter as set forth in claim 1, comprising:
a first constraining member constraining movement of the first leading blade driving member, and
a second actuator moving the first constraining member to a position constraining the movement of the first leading blade driving member.

9. The focal plane shutter as set forth in claim 1, wherein:
the charging portion comprises a setting portion pushing the second leading blade driving member and the trailing blade driving member, and a third actuator driving the setting portion.

10. The focal plane shutter as set forth in claim 9, wherein:
a third actuator:
is driven by a first driving voltage applying a second biasing force and a third biasing force to a second biasing member and a third biasing member, respectively, in imaging wherein, from a state wherein the leading blade has closed the opening, the leading blade opens the opening and the trailing blade closes the opening; and
is driven by a second driving voltage, which is smaller than the first driving voltage, applying the third biasing force to the third biasing member in imaging wherein, from a state wherein the leading blade and the trailing blade have opened the opening, the trailing blade closes the opening.

11. The imaging device comprising a focal plane shutter as set forth in claim 1.

12. The electronic device comprising a focal plane shutter as set forth in claim 1.

13. A focal plane shutter comprising:
a base plate wherein an opening is formed;
a leading blade and a trailing blade open and closing the opening;
a leading blade driving portion driving the leading blade in the direction of opening the opening through a first biasing force of a first biasing member;
a trailing blade driving portion driving the trailing blade in the direction of closing the opening through a second biasing force of a second biasing member; and
a first actuator applying the first biasing force to the first biasing member and applying the second biasing force to the second biasing member, wherein:
the first actuator:
is driven by a first driving voltage applying the first biasing force and the second biasing force to the first biasing member and the second biasing member, respectively, in imaging wherein, from a state wherein the leading blade has closed the opening, the leading blade opens the opening and the trailing blade closes the opening; and
is driven by a second driving voltage, which is smaller than the first driving voltage, applying the second biasing force to the second biasing member in imaging wherein, from a state wherein the leading blade and the trailing blade have opened the opening, the trailing blade closes the opening.

* * * * *